United States Patent [19]
Whalen

[11] Patent Number: 6,006,986
[45] Date of Patent: Dec. 28, 1999

[54] GLOBAL TIME CALCULATOR

[76] Inventor: Edward E. Whalen, 101 Lombard St., San Francisco, Calif. 94111

[21] Appl. No.: 08/958,949

[22] Filed: Oct. 28, 1997

[51] Int. Cl.$^6$ ..................................................... G06G 1/02
[52] U.S. Cl. .......................................................... 235/70 R
[58] Field of Search ............................... 235/70 A, 70 R, 235/71 A

[56] References Cited

U.S. PATENT DOCUMENTS

| | | | |
|---|---|---|---|
| 445,392 | 1/1891 | Cowell ......................................... 35/40 |
| 1,607,560 | 11/1926 | Pennino ..................................... 235/88 |
| 2,463,758 | 3/1949 | Freel ............................................ 35/44 |
| 3,002,337 | 10/1961 | Smith ........................................... 58/44 |
| 3,083,906 | 4/1963 | Giuntini ..................................... 235/89 |
| 3,627,199 | 12/1971 | Hill ............................................ 235/85 |
| 3,807,629 | 4/1974 | Ishii et al. .............................. 235/89 R |
| 4,032,754 | 6/1977 | Ageton .................................... 235/78 R |
| 4,251,935 | 2/1981 | Wright ........................................ 40/109 |
| 4,262,939 | 4/1981 | Schoettle, Jr. ............................. 283/65 |
| 4,307,458 | 12/1981 | Lin ............................................ 368/25 |
| 4,316,272 | 2/1982 | Naito .......................................... 368/21 |
| 4,324,975 | 4/1982 | Rees ....................................... 235/70 A |
| 4,338,025 | 7/1982 | Engel ......................................... 356/71 |
| 4,425,499 | 1/1984 | Newton ................................. 235/70 R |
| 4,580,814 | 4/1986 | Berler ......................................... 283/67 |
| 4,847,819 | 7/1989 | Hong .......................................... 368/21 |
| 5,007,033 | 4/1991 | Kubota et al. ............................. 368/21 |
| 5,054,008 | 10/1991 | Darling ..................................... 368/27 |
| 5,065,003 | 11/1991 | Wakatsuki et al. ..................... 235/472 |
| 5,110,155 | 5/1992 | Piechocki et al. ...................... 283/117 |
| 5,401,942 | 3/1995 | Buerger ................................. 235/70 R |
| 5,437,240 | 8/1995 | Miroyan .................................. 116/235 |
| 5,708,260 | 1/1998 | Maier et al. .......................... 235/70 R |

FOREIGN PATENT DOCUMENTS

| | | | |
|---|---|---|---|
| 0349128 A2 | 1/1990 | European Pat. Off. ........ B42D 15/04 |
| 0457032 A2 | 11/1991 | European Pat. Off. ......... G04G 9/00 |
| 2211893 | 9/1973 | Germany ........................ G04B 19/22 |

Primary Examiner—Donald Hajec
Assistant Examiner—Diane I. Lee
Attorney, Agent, or Firm—Lambach & Lambach L.L.P.

[57] ABSTRACT

A global time calculator includes an insert and a sleeve. The insert is marked on both its sides (or on a single page slide insert on one side) with vertical columns of incremental time designations, and may or may not contain a stop mechanism. The insert is slidable and connected with the sleeve so as to be shiftable in a vertical direction. Both sides of the sleeve (or in some embodiments a single side of the sleeve) have areas for obscuring vertically aligned time designations that are in excess of unobscured time designations.

21 Claims, 23 Drawing Sheets

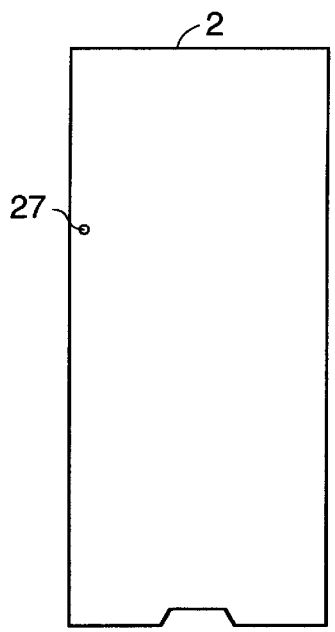 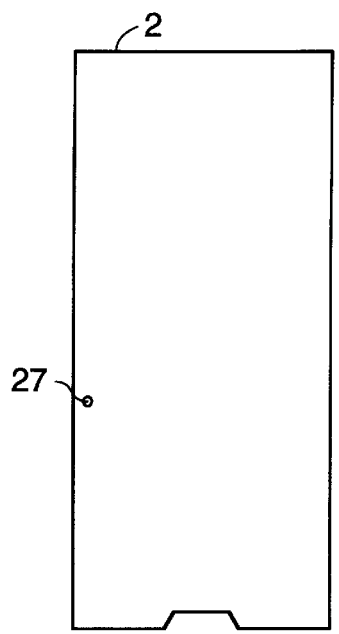 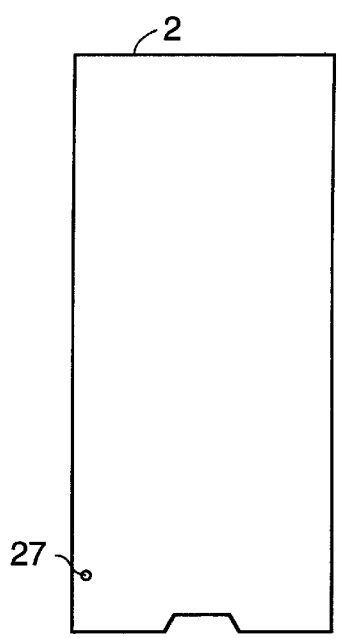
FIG. 13A  FIG. 13B  FIG. 13C
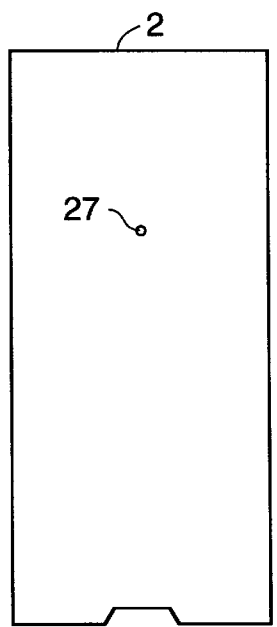 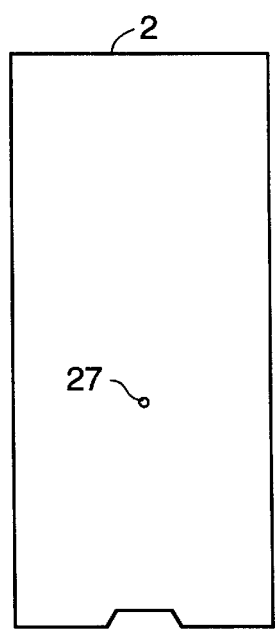 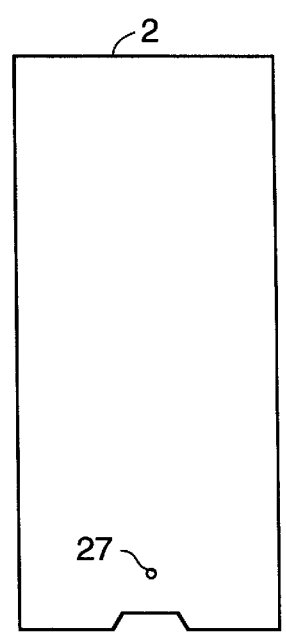
FIG. 13D  FIG. 13E  FIG. 13F

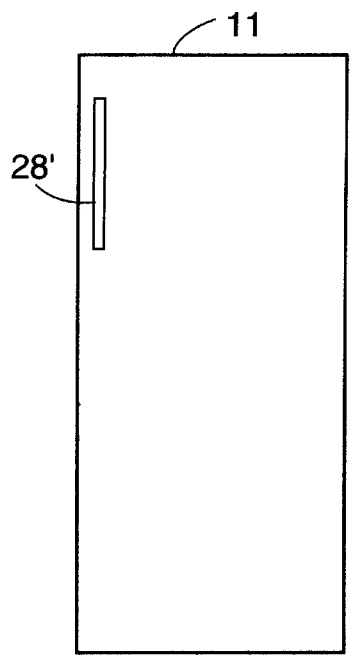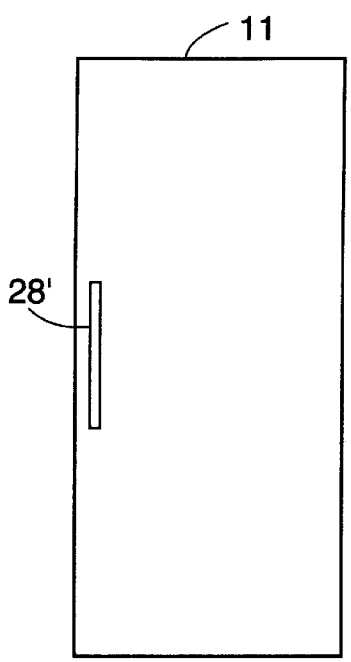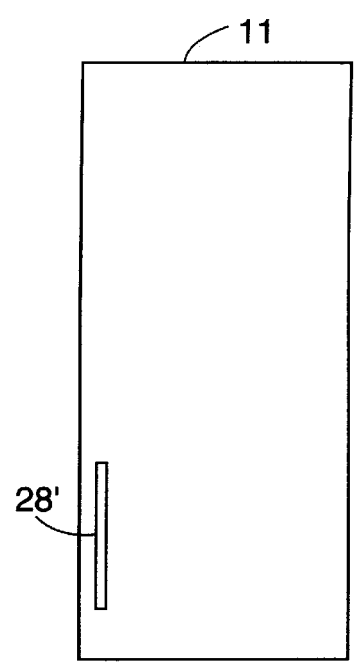
FIG. 14A     FIG. 14B     FIG. 14C
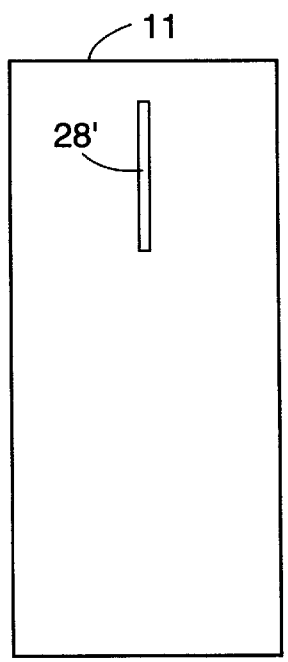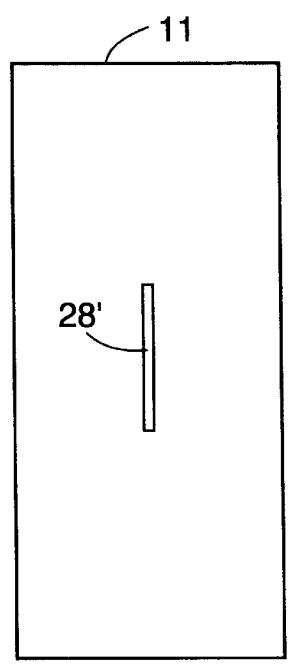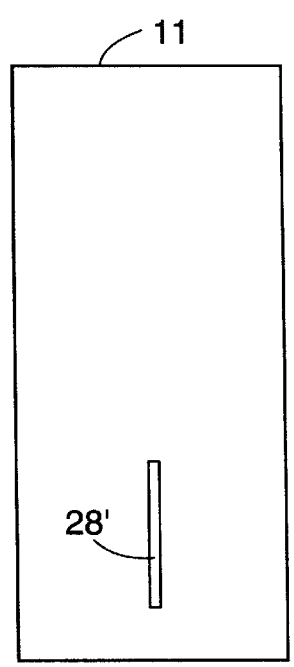
FIG. 14D     FIG. 14E     FIG. 14F

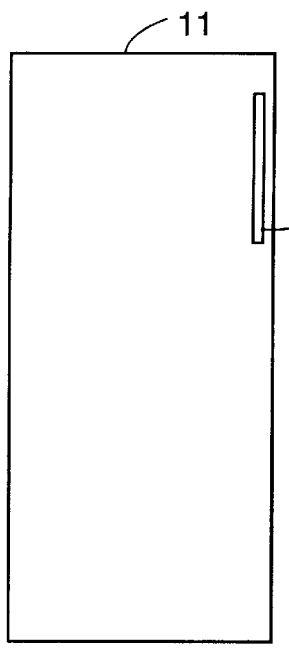
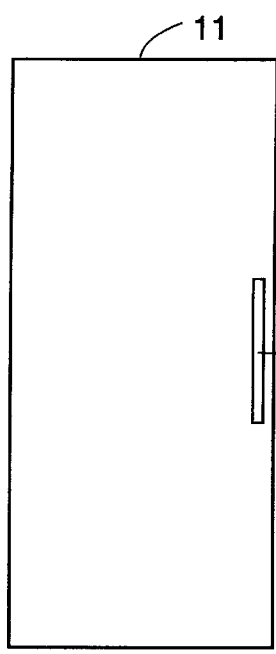
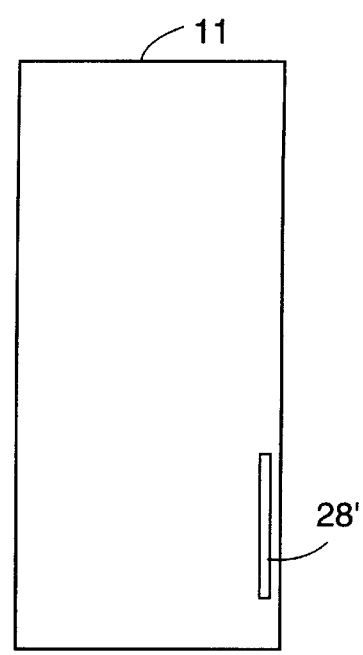
FIG. 14G  FIG. 14H  FIG. 14I
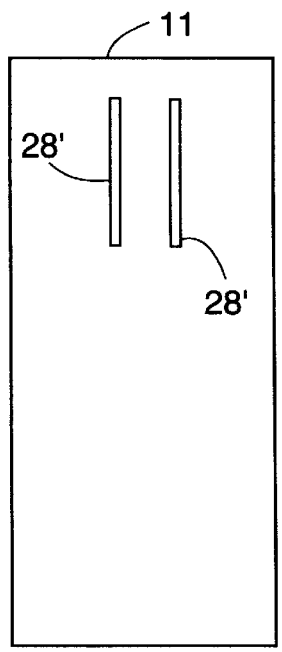
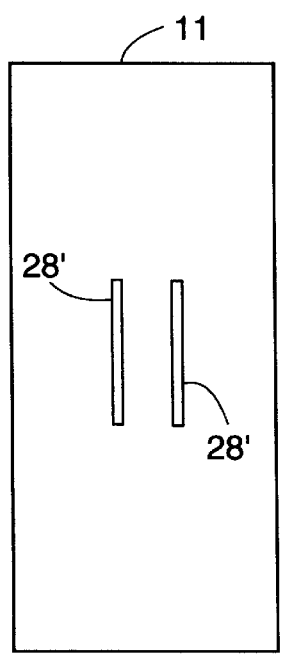
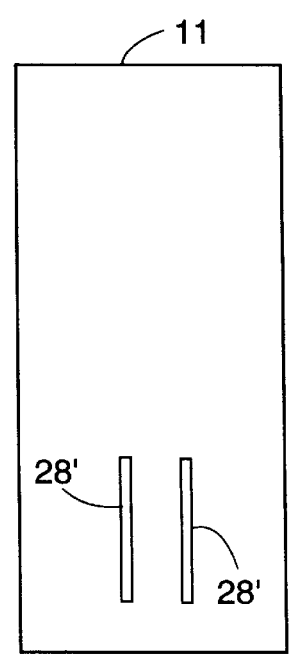
FIG. 14J  FIG. 14K  FIG. 14L

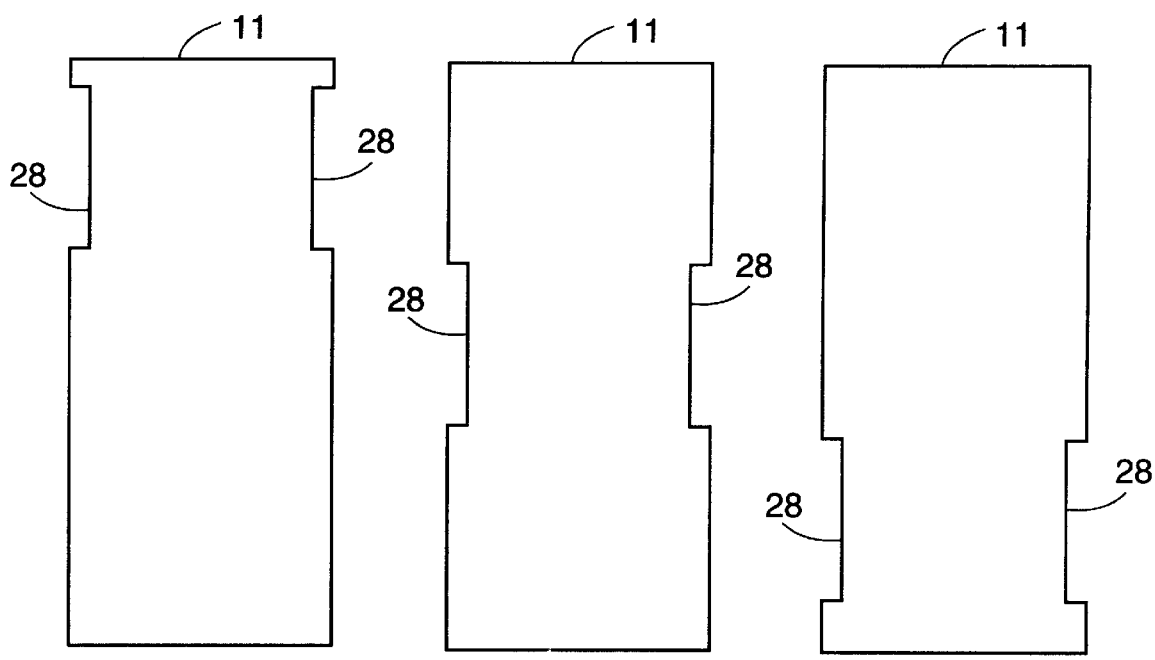
FIG. 15G  FIG. 15H  FIG. 15I

GLOBAL TIME CALCULATOR

BACKGROUND OF THE INVENTION

1. Field of the Invention

The present invention relates to a time calculating apparatus, and more particularly to a sliding type apparatus that enables one to quickly and simultaneously display corresponding local standard time in all of the countries of the world, a number of overseas dependencies of various countries, and a large number of cities throughout the world.

2. Notice of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

3. Description of the Related Art

As is well known, with the increasing use of intercontinental world travel, particularly with supersonic transportation being available, and the various telecommunications systems around the world, the different areas of the world are coming closer together. There have been attempts to satisfy the need to determine the exact time in the different areas of the world for people who are traveling or are interested in sending or using international forms of communication. Reliance is sometimes made on the use of multiple clocks, for example, in airline terminals, telegraph offices and the like, to show the various times around the world. This, however, is costly, and each clock must be calibrated from time to time. In other instances, electronic devices are used to read out the time in various parts of the world. However, this approach is usually not convenient for personal use since electronic devices are generally voluminous, expensive and/or cumbersome and sometimes even impossible to be transported from place to place.

As described in U.S. Pat. No. 445,392 it is known to construct a time chart from a map marked with meridians arranged apart at specified distances, where a movable strip is marked with the divisions of time corresponding with the time intervals between the meridians. However, this device is complicated to employ as it requires the user to have significant and specific geographical awareness and perform a complicated series of manipulations to determine the time in a specific country in a geographic region. Such manipulations render the device inefficient and generically impractical to use.

U.S. Pat. No. 3,807,629 teaches a slide rule for computing a time difference. However, this device is also complicated to use, requiring one to choose a relative geographic location and perform a series of adjustments to the device to calculate the time difference.

It is known from U.S. Pat. No. 1,607,560 to construct a time indicating device from a dial. However, due to its design, only a small number of localities can be displayed on its face, limiting its use. Furthermore, such a device is particularly cumbersome and not easily carried on one's person.

In U.S. Pat. No. 4,307,458 a watch for displaying multiple world times is disclosed. However, due to its structure, this device is limited in the number of localities which can be displayed. Furthermore, its design requires synchronization of its electrical elements, which can fail, rendering the device useless. Moreover, the use of electronic components increases the cost of the watch.

U.S. Pat. No. 5,303,956 is directed to a travel document folder having a time zone conversion chart rotatably mounted to one leaf of the folder. However, such design is inconvenient as its design inherently limits its content.

U.S. Pat. No. 5,054,008 teaches a device for determining the time anywhere in the world, relative to any selected geographical location. However, this device is complicated to use since it requires a significant awareness of geography. It also utilizes electronic components which make it costly to produce. Also, such electronic components may fail, rendering the device useless.

Finally, U.S. Pat. No. 2,463,758 relates to time indicating devices of the type with which the time of day or night at any place on the earth's surface can be calculated if a given time of day or night is known in a relative location. However, this device is complicated to use as it requires an extensive comprehension of geography. Furthermore, it requires the user to perform a number of complicated manipulations in order to achieve the desired result.

In summary, known devices for determining local standard time in various countries and areas around the world include some if not all of the following disadvantages: such devices are complicated to use; operation of these devices requires significant prior knowledge of geography and adequate mathematical capability plus time zone knowledge to calculate time zone differentials; many of the devices use electronic components which add to cost and create reliability issues; such devices are inefficient, impractical and not easily portable; the information content of the devices are limited by their design; and these devices are costly and not user friendly.

However, owing to the significant increase in international travel and communications and the globalization of world business, a great need exists for an efficient, compact and user-friendly time calculating apparatus.

SUMMARY OF THE INVENTION

It is an object of the invention to provide a time calculating apparatus device which will quickly and simultaneously display the local standard time in all of the countries in the world, a number of overseas dependencies of various countries, as well as a significant number of cities in the world.

It is a further object of the invention to improve efficiency and ease of use in time calculating devices.

It is yet another object of the invention to provide a reasonably priced and versatile time calculating device.

It is an additional object of the invention to provide a time calculating device which is simple in construction and reasonable in terms of its cost of manufacture.

It is yet a further object of the invention to delineate Daylight Savings time countries and/or dependencies as a part of facilitating the proper calculation and display of local times in all countries and dependencies in the world.

It is a feature of the invention to simultaneously display local standard time for countries of the world, overseas dependencies of various countries, and/or cities in the world.

It is a further feature of the invention to allow the rapid selection of a user's local time to facilitate the calculation and display of local time in all countries throughout the world, a number of overseas dependencies of various countries and a significant number of cities in the world.

An advantage of the invention is its portability for a user.

It is a further advantage of the invention to provide a time calculating apparatus having a low weight and minimum bulk.

According to one aspect of the present invention, a global time calculator includes an insert including a first side, a second side, and a stop corner, said first side and said second side having a plurality of longitudinally disposed rows of incremental time designations displayed thereon, said rows defining a plurality of transversely disposed sets of predetermined time designations, and a sleeve, wherein said insert is slidably connected with said sleeve so as to be shiftable in a vertical direction, said sleeve including a first side and a second side, both said first side and said second side of said sleeve operative to obscure vertically aligned time designations that are in excess of displayed time designations.

According to a further aspect of the present invention, a global time calculator includes an insert, wherein said insert includes a first side, a second side, and a stop corner, said first side and said second side having a plurality of longitudinally disposed rows of incremental time designations thereon, said rows defining a plurality of transversely disposed sets of predetermined time designations, wherein said time designations appear in a first color for time the same day and a second color for time the next day, and a sleeve, wherein said insert is slidably connected with said sleeve so as to be shiftable in a vertical direction, said sleeve including a first side and a second side, both said first side and said second side of said sleeve operative to obscure vertically aligned time designations that are in excess of unobscured time designations, and wherein said first side and said second side of said sleeve each include three panel sets, said panel sets including a plurality of geometrically shaped windows.

According to another aspect of the present invention, a global time calculator includes an insert including a first side and a second side, said first side and said second side having a plurality of longitudinally disposed rows of incremental time designations displayed thereon, said rows defining a plurality of transversely disposed sets of predetermined time designations, and a sleeve, wherein said insert is slidably connected with said sleeve so as to be shiftable in a vertical direction, said sleeve including a first side and a second side, both said first side and said second side of said sleeve operative to obscure vertically aligned time designations.

According to yet another aspect of the present invention, a global time calculator includes an insert, wherein said insert includes a first side, a second side, said first side and said second side having a plurality of longitudinally disposed rows of incremental time designations thereon, said rows defining a plurality of transversely disposed sets of predetermined time designations wherein said time designations appear in a first color for time the same day and a second color for time the next day, and a sleeve, wherein said insert is slidably connected with said sleeve so as to be shiftable in a vertical direction, said sleeve including a first side and a second side, both said first side and said second side of said sleeve operative to obscure vertically aligned time designations that are in excess of unobscured time designations, and wherein said first side and said second side of said sleeve each include three panel sets, said panel sets including a plurality of geometrically shaped windows.

According to yet a further aspect of the present invention, a global time calculator includes an insert including a first side, a second side, and a stop corner, said first side and said second side having a plurality of longitudinally disposed rows of incremental time designations displayed thereon, said rows defining a plurality of transversely disposed sets of predetermined time designations, and a sleeve, wherein said insert is slidably connected with said sleeve so as to be shiftable in a vertical direction, said sleeve including a first side, a second side, and a securing means, both said first side and said second side of said sleeve operative to obscure vertically aligned time designations that are in excess of unobscured time designations.

According to an aspect of the present invention, a global time calculator includes an insert, wherein said insert includes a first side and second side, said first side and said second side having a plurality of longitudinally disposed rows of incremental time designations thereon, said rows defining a plurality of transversely disposed sets of predetermined time designations wherein said time designations appear in a first color for time the same day and a second color for time the next day, and a sleeve, wherein said insert is slidably connected with said sleeve so as to be shiftable in a vertical direction, said sleeve including a first side, a second side and a securing means, both said first side and said second side of said sleeve operative to obscure vertically aligned time designations that are in excess of unobscured time designations, and wherein said first side and said second side of said sleeve each include three panel sets, said panel sets including a plurality of geometrically shaped windows.

According to another aspect of the present invention, a global time calculator includes an insert, wherein said insert includes a first side a second side and a stopping means, said first side and said second side having a plurality of longitudinally disposed rows of incremental time designations thereon, said rows defining a plurality of transversely disposed sets of predetermined time designations, and a sleeve, wherein said insert is slidably connected with said sleeve so as to be shiftable in a vertical direction, said sleeve including a first side, a second side and a securing means, both said first side and said second side of said sleeve operative to obscure vertically aligned time designations that are in excess of unobscured time designations.

According to a further aspect of the present invention, a global time calculator includes an insert, wherein said insert includes a first side a second side and a recess, said first side and said second side having a plurality of longitudinally disposed rows of incremental time designations thereon, said rows defining a plurality of transversely disposed sets of predetermined time designations, a sleeve, wherein said insert is slidably connected with said sleeve so as to be shiftable in a vertical direction, said sleeve including a first side, a second side and a securing means, both said first side and said second side of said sleeve operative to obscure vertically aligned time designations that are in excess of unobscured time designations, and a fastener for securing the sleeve about the insert, the fastener operative to limit movement of the sleeve within boundaries set by the recess.

According to yet another aspect of the present invention, a global time calculator includes an insert including a stop corner and a plurality of incremental time designations displayed thereon, and a sleeve, wherein said insert is slidably connected with said sleeve so as to be shiftable in a vertical direction, said sleeve operative to obscure vertically aligned time designations that are in excess of displayed time designations.

According to yet a further aspect of the present invention, a global time calculator includes an insert including a recess and a plurality of incremental time designations displayed thereon, a sleeve, wherein said insert is slidably connected with said sleeve so as to be shiftable in a vertical direction, said sleeve operative to obscure vertically aligned time designations that are in excess of displayed time designations, and at least one fastener disposed through the sleeve, the fastener operative to limit movement of the insert based upon a length of the recess.

According to an aspect of the present invention a program storage device readable by a machine, tangibly embodies a program of instructions executable by the machine to perform method steps for calculating time throughout the world, wherein said method steps include moving within an overlay a plurality of longitudinally disposed rows of incremental time designations, said rows defining a plurality of transversely disposed sets of predetermined time designations, shifting in a vertical direction the longitudinally disposed rows of incremental time designations for display within windows of the overlay, and obscuring vertically aligned time designations that are in excess of displayed time designations.

According to a further aspect of the present invention, a program storage device readable by a machine, tangibly embodies a program of instructions executable by the machine to perform method steps for calculating time throughout the world, wherein said method steps include creating for display an overlay having a plurality of longitudinally disposed rows of incremental time designations, said rows defining a plurality of transversely disposed sets of predetermined time designations, creating for display beneath the overlay longitudinally disposed rows of incremental time designations for display within windows of the overlay, shifting in a vertical direction the longitudinally disposed rows of incremental time designations for display within windows of the overlay, and obscuring vertically aligned time designations that are in excess of displayed time designations.

Other objects and advantages of the present invention will become readily apparent to those skilled in the art from the following detailed descriptions, wherein shown and described are various embodiments of the invention. As will be realized, the invention is capable of other and different embodiments, and its several details are capable of modifications in various obvious respects, all without departing from the invention. Accordingly, the drawings and descriptions are to be regarded as illustrative in nature, and not as restrictive, wherein like reference numerals within each of the figures refer to like elements,

BRIEF DESCRIPTION OF THE DRAWINGS

FIG. 1 is a plan view of an embodiment of the present invention, which illustrates a front side of the sleeve portion thereof, a left side vertical glue flap containing a rectangular recessed die cut stop mechanism and a friction fit sliding insert with a tab type die cut stop mechanism.

FIGS. 15A–15I illustrate alternative placements for rectangular recessed (one side open) die cut stop mechanisms on the sliding insert.

DETAILED DESCRIPTIONS OF EMBODIMENTS, FABRICATION AND ASSEMBLY

Referring now to FIG. 1, an embodiment of the present invention is a calculator in the form of a multi-paged booklet. A first page 1 serves as a cover page and contains a product name, a short description of the calculator and, if desired, the name and address of a manufacturer. It may also contain various legal notices. This page may be customized to display a logo and/or corporate advertising.

A reverse side 1A of cover page 1 may contain advertising or details about the device and contacts for arrangement of purchase. The reverse side 1A may also contain various legal notices.

A following page 2 is the initial page of the time chart portion of the embodiment of the invention. At the top are instructions on how to use the calculator with legends for specific symbols used within the chart such as asterisks, crosses and twin crosses. The page 2 is divided into three sets of panels. In this embodiment of the invention, the panel sets are divided into three geographic area panel sets, which include eleven die cut windows, eleven panels, fourteen text columns, and three geographic area title boxes. These geographic area sets of panels allow for multiple windows which simultaneously display multiple geographically distinct time designations. The bottom of the page contains various legal notices. An insert 11 slidably moves within a sleeve, as further described below with reference to FIGS. 1A, 1B, 1C, 2, 2A, 3, 4A, 4B, 5, 6 and 7.

Figure 3:
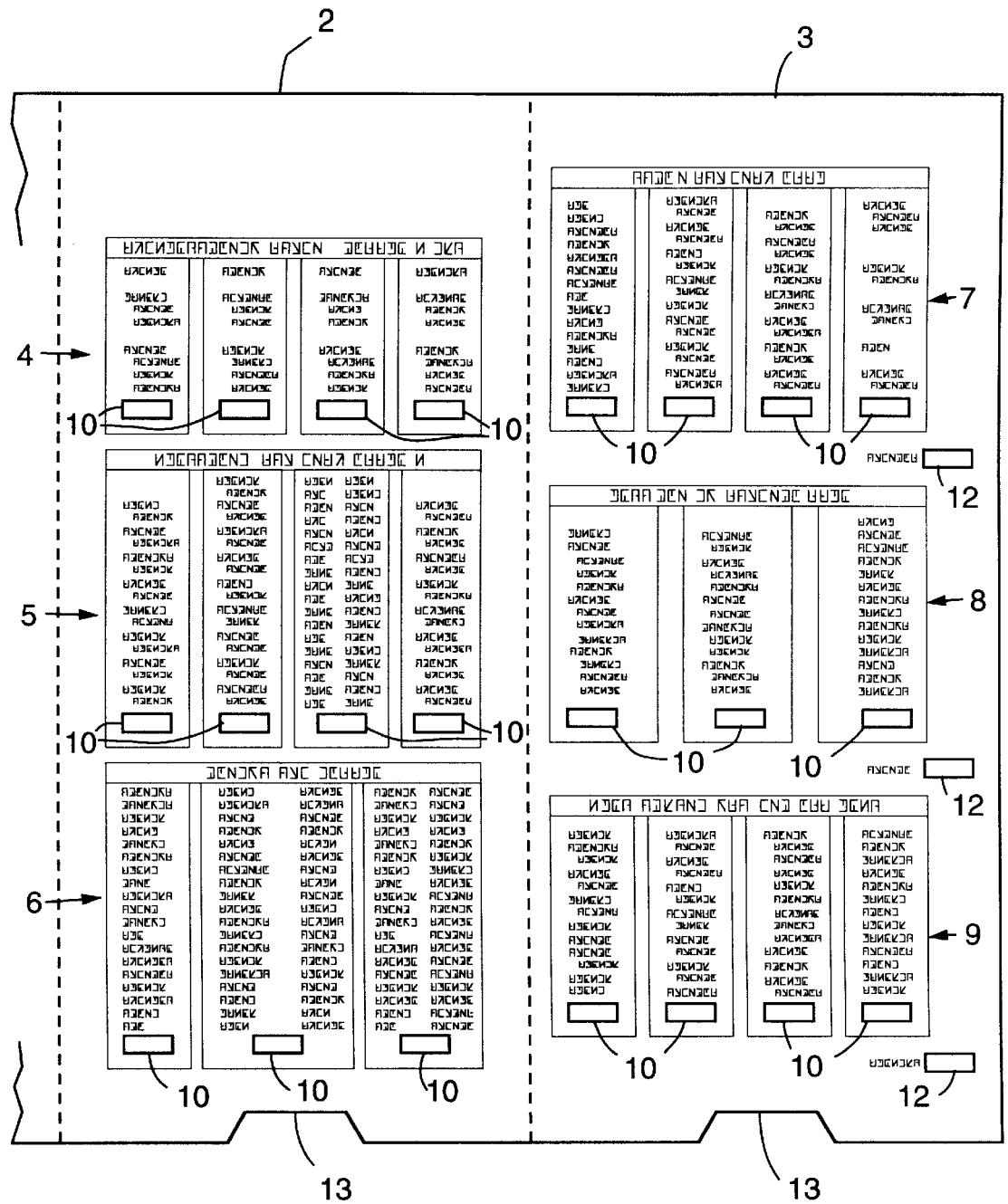
FIG. 3 is a plan view of the front and back sides of the sleeve portion of the device of FIG. 1, illustrating the panel sets configuration, multiple die cut rectangular windows and two bottom midpoint cut outs for access to the sliding insert.

With reference now to FIG. 3, a first set of geographic area 10 panels 4 is four in number and titled "CANADA & USA—STANDARD TIME ZONES." This embodiment contains four text columns; one text column in each panel, moving from left to right, entitled "PACIFIC," "MOUNTAIN," "CENTRAL" and "EASTERN." Each of the four panels covers a specific standard time zone for Canada and the United States and lists two cities for Canada and three cities for the United States within each of the four time zones. Each panel is a specific offset in hours from Greenwich Mean Time/UTC.

Located at the bottom of each of the text columns, and centered within the panel, there are rectangular die cut windows 10, ⅛ inch high by ⅜ inch long, that display time in Canada and the United States and various cities for each country when insert 11 is set.

A second set of geographic area panels 5 are four in number, and titled "CARIBBEAN AND LATIN AMERICA." This set of panels contains five text columns; one text column in each of three panels and two text columns in one panel. Each panel is a specific offset in hours from Greenwich Mean Time/UTC and contains the names of countries/dependencies/cities, or where space does not permit, countries and dependencies only.

Centered within each panel and located at the bottom of each of the three single text columns, and centered under one double text column, there are rectangular die cut windows 10, ⅛ inch high by ⅜ inch long, which show the time in the particular countries/dependencies/cities when insert 11 is set.

A third set of geographic area panels 6 is three in number and titled "AFRICA, EUROPE AND MIDDLE EAST." In this panel set, a first panel contains one text column, while second and third panels each contain two text columns. Each panel is a specific offset in hours from Greenwich Mean Time/UTC and contains names of countries/dependencies/cities, or where space does not permit, countries and dependencies only.

Centered within each panel and located at the bottom of the first text column, the second and third and the fourth and fifth text columns, there is a rectangular die cut window 10, ⅛ inch high by ⅜ inch long, which displays the time in the particular countries/dependencies/cities when insert 11 is set.

A following page 3 is the second page of the time chart portion of this embodiment of the invention. Page 3 is divided into three sets of panels. In this embodiment of the invention, these panel sets are further divided into three geographic area panel sets, which include fourteen die cut windows (eleven 10 which are within the panels; and three 12 below and outside of the geographic area panel sets 7, 8, and 9), eleven panels, eleven text columns, and three geographic area title boxes. These geographic area sets of panels allow for multiple windows which simultaneously display multiple geographically different time designations. The bottom of page 3 contains various legal notices. An insert 11 slidably moves within a sleeve, as further described below with reference to FIGS. 1A, 1B, 2, 2A, 3, 4A, 4B and 5.

With reference again to FIG. 3, the fourth set of geographic area panels 7 is four in number and titled "EAST AFRICA, ASIA AND THE NEAR EAST." This panel set contains four text columns; one text column in each panel. Each panel is a specific offset in hours from Greenwich Mean Time/UTC and contains the names of countries/dependencies/cities, or where space does not permit, countries and dependencies only.

Centered within each panel and located at the bottom of each of the four text columns, there is a rectangular die cut window 10, ⅛ inch high by ⅜ inch long, that displays the time in the particular countries/dependencies/cities when insert 11 is set.

The fifth set of geographic area panels 8 are three in number and titled "ASIA AND SOUTH EAST ASIA." This fifth panel set contains three text columns; one text column in each panel. Each panel is a specific offset in hours from Greenwich Mean Time/UTC and contains the names of countries/dependencies/cities, or where space does not permit, countries and dependencies only.

Centered within each panel and located at the bottom of each of the three text columns, there is a rectangular die cut window 10, ⅛ inch high by ⅜ inch long, that displays the time in the particular countries/dependencies/cities when insert 11 is set.

The sixth set of geographic area panels 9 is four in number and titled "ASIA PACIFIC AND THE FAR EAST." It contains four text columns; one text column in each panel. Each panel is a specified offset in hours from Greenwich Mean Time/UTC and contains the names of countries/dependencies/cities, or where space does not permit, countries and dependencies only.

Centered within each panel and located at the bottom of each of the four columns, there is a rectangular die cut window 10, ⅛ inch high by ⅜ inch wide, that displays the time in the particular countries/dependencies/cities when insert 11 is set.

Just below the lower right corner of each of these three sets of geographic area panels 7, 8 and 9, and not within the panel sets 7, 8 and 9, there is an additional rectangular die cut window 12, ⅛ inch high by ⅜ inch wide. The upper most window displays and is titled "PACIFIC STANDARD TIME;" the middle window displays and is titled "CENTRAL STANDARD TIME;" and, the bottom window displays and is titled "EASTERN STANDARD TIME." These windows allow fast and easy reference to the time in three Canadian and United States time zones and to set the time in three Canadian and United States time zones without having to turn back to the reverse side 2 of the calculator. Various legal notices are included between the last panel set and the bottom of the calculator.

A midpoint cut out 13 is located at the bottom of each of pages 2 and 3. This provides access to insert 11 that lies between pages 2 and 3. In this embodiment of the invention the cut out 13 is 1 inch wide and ½ inch high.

In manufacturing the calculator, the calculator should be scored to form the booklet. In one embodiment of the invention, both the sleeve 2 and insert 11 are fabricated from 14 point glossy white paper stock.

An alternative embodiment is one where both the sleeve 2 and insert 11 are fabricated from Kimdura® synthetic paper stock which is a polypropylene composite material. Such material is available from Kimberly Clark Corporation, 1400 Holcomb Bridge Road, Roswell, Ga. 30076. There are various alternative embodiments for the invention using the Kimdura® synthetic paper stock depending on the attributes desired for the device. Kimdura® attributes are discussed briefly below. Some of the alternative embodiments for fabrication using Kimdura® are: 1. Fabricating the device using the heaviest standard Kimdurao paper (Kimdura® 300); 2. Fabricating the device by bonding together two or more sheets of Kimdura® 300; 3. Fabricating the device by bonding together two or more sheets of KimduraO using any of the various sheet stocks in which Kimdura® is manufactured. (Kimdura® 80, 95, 110, 130, 150, 200, 250, and 300). 4. Fabricating the device by bonding together two Kimdura® sheets with a third porous substrate material.

The 14 point glossy paper stock embodiment is used to obtain the most economical fabrication cost for the invention. The Kimdura® synthetic alternative embodiment for fabrication is utilized to obtain various additional positive attributes for the invention. Fabrication with Kimdura® is substantially more expensive due to higher material costs, use of special inks, varnish requirements, longer dry and set times and various different fabrication and assembly requirements. Accordingly, the Kimdura material is primarily utilized in high end versions of the invention. The positive attributes mentioned above are imparted by the Kimdura® material itself. In further detail, the Kimdura® synthetic material is made by extruding polypropylene film and fillers through a die and stretching it lengthwise. Additional layers are extruded onto both sides and the composite is stretched crosswise. The material is further treated to enhance its appearance and performance. Kimdura® synthetic material has various characteristics which make it a suitable alternative material for practicing the invention. Such synthetic material has a high tear resistance, resists stains, dirt and grease and can be folded thousands of times without fracturing. In addition, such synthetic material has a high degree of uniformity from lot to lot and is not affected by most polar and non-polar solvents at ambient temperatures. Furthermore, Kimdura® synthetic material has outstanding resistance to ultraviolet radiation and sunlight, is impervious to water, and floats when immersed in water. It is possible, however, that mineral oil and similar aliphatic hydrocarbons will damage such synthetic material.

The specific details and description for manufacturing the invention vary depending upon: 1.) the design characteristics of the insert to be utilized; 2.) whether or not a glue flap is utilized; and, 3.) the design characteristics of the glue flap when it is used. The basic methods of manufacturing the invention will be understood by those skilled in the art from the following descriptions. As will be realized, the invention is capable of other and different embodiments, and its several details of manufacturing are capable of modifications in various respects, all without departing from the invention. Accordingly, as previously stated, the drawings and descriptions are to be regarding as illustrative in nature, and not as restrictive, wherein like reference numerals within each of the figures refer to like elements.

Figure 1A:
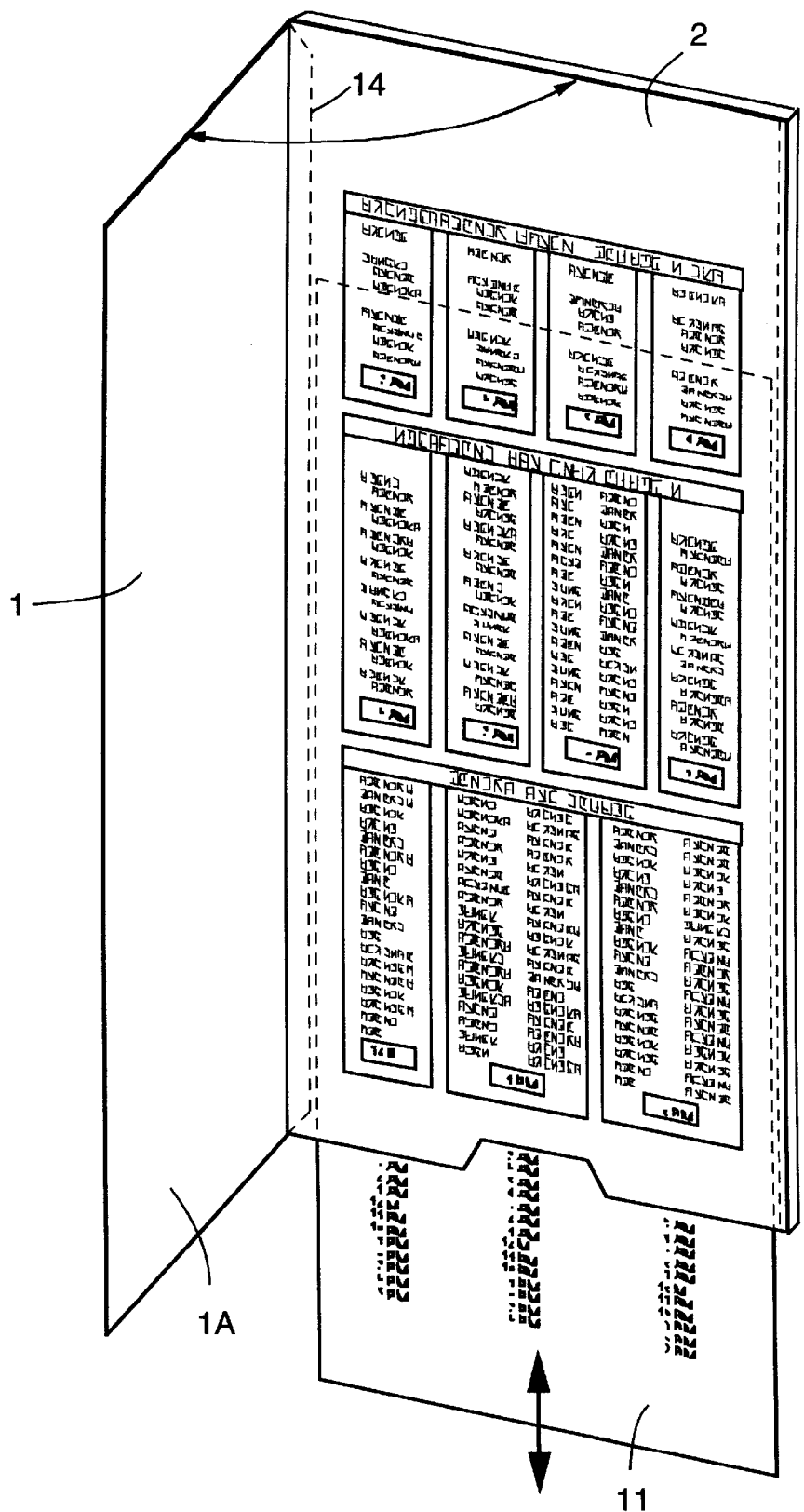
FIG. 1A is a plan view of an embodiment of the invention which illustrates a front side of the sleeve portion thereof, a left side vertical glue flap and a friction fit sliding insert which slides along the edge of the vertical glue flap.
Figure 1B:
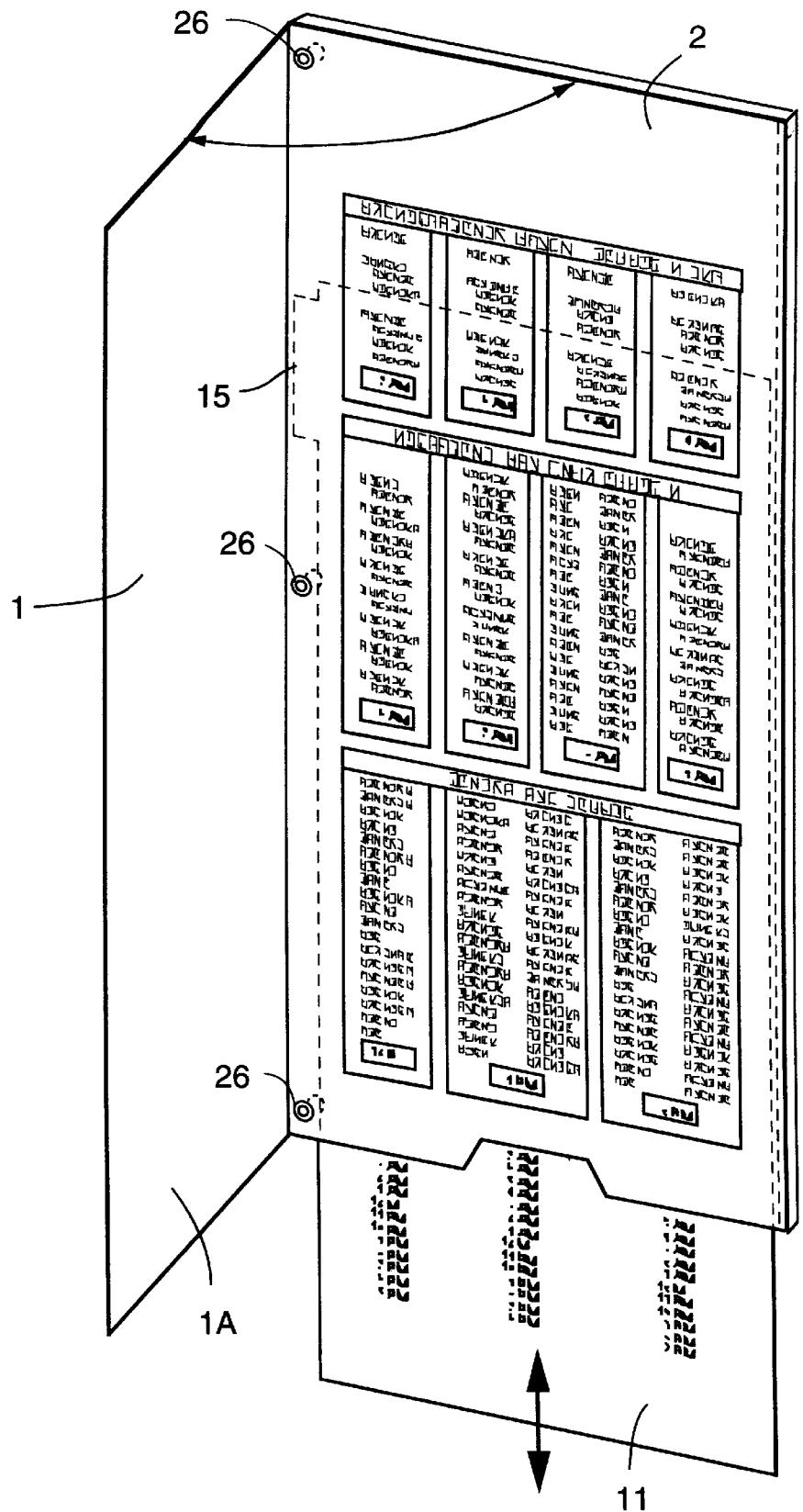
FIG. 1B is a plan view of an embodiment of the invention which illustrates a front side of the sleeve portion thereof, a friction fit sliding insert with a tab type stop mechanism and three grommets. The grommets are located at the left side of the page at the top, midpoint and bottom and fasten together the sleeve portion. The middle grommet and top grommets operate as a stop mechanism for the tab type stop mechanism. No glue flap is utilized.
Figure 1C:
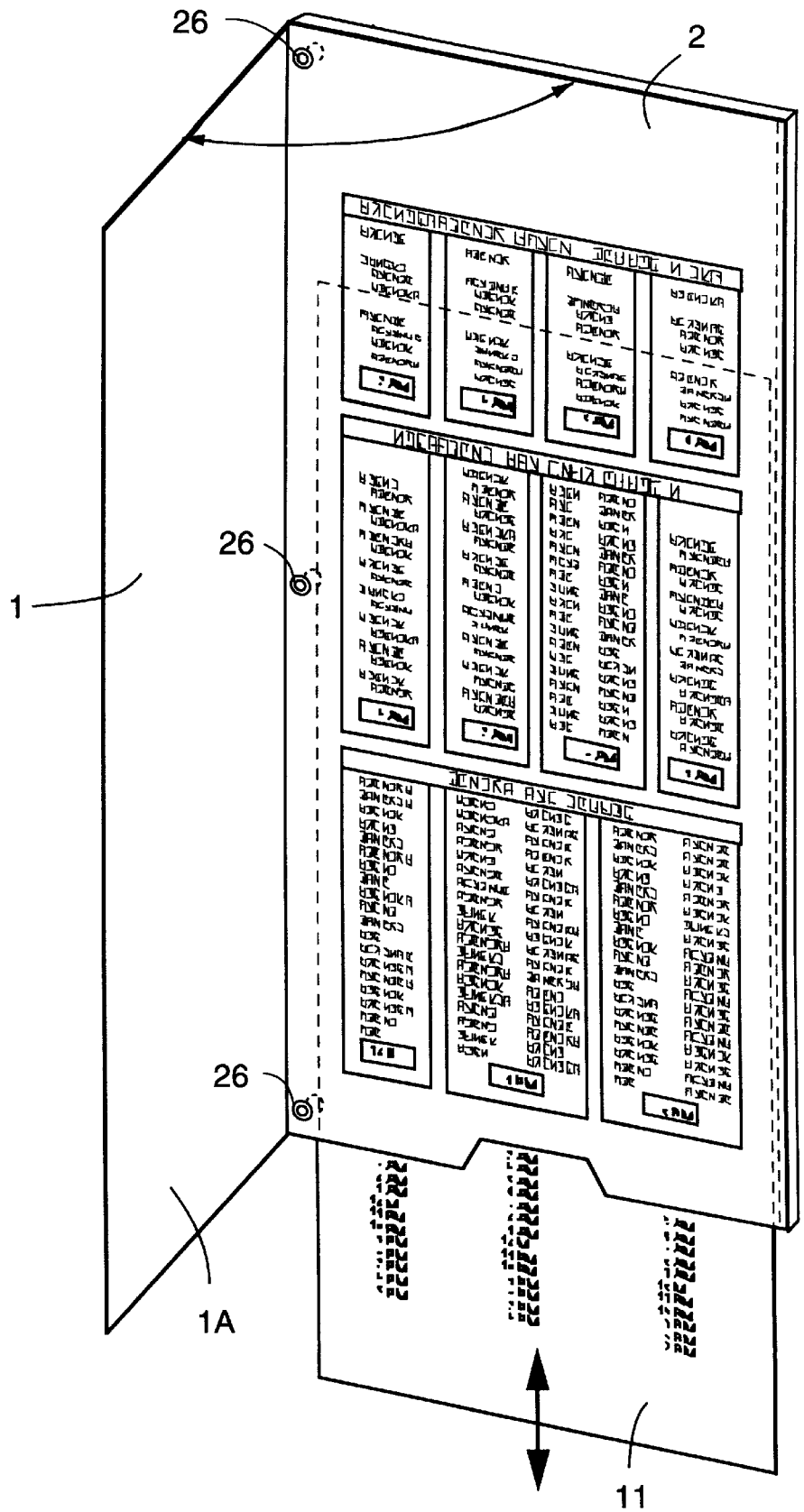
FIG. 1C is a plan view of an embodiment of the invention which illustrates a front side of the sleeve portion thereof, a friction fit sliding insert without a stop mechanism and three grommets. The grommets are located at the left side of the chart page at the top, midpoint and bottom and fasten together the sleeve portion.

With reference now to FIG. 1C, one method of manufacturing the calculator is now described. In manufacturing the calculator, the calculator is scored to form a booklet. The scoring process in this method does not include the folding under of a glue flap 14. A sliding insert 11 is used. Insert 11 does not have a stop mechanism. Insert 11 is placed between pages 2 and 3. Grommet holes 27 are drilled through the midpoint of the left margin of page 2 at the top, midpoint and bottom of page 2 and pass through page 3. Grommets 26 are then inserted into the drill cut holes and expanded. In this method of manufacture pages 2 and 3 are held together only by the grommets 26. Insert 11 is held in place only by friction between insert 11 on the one hand, and sleeve 2 and/or grommets 26 on the other hand. Insert 11 can be removed from sleeve 2. Pages 2 and 3 are, however, subject to tearing as they are not completely fastened together across their full vertical length.

The various methods of fabricating the calculator all rely upon a friction fit insert 11. However, other means of selectively inhibiting movement of insert 11 may be utilized, particularly in the case where the insert is coated with an anti-friction agent. Such means include manually compressing the sleeve 2 to inhibit movement of insert 11, use of a mechanical clamp or even a simple paper clip which compresses sleeve 2 against insert 11.

Turning now to FIG. 1B, a second method of manufacturing the calculator is described. In manufacturing the calculator, the calculator is scored to form a booklet. The scoring process in this method does not include the folding under of a glue flap 14. Insert 11 has a die cut tab type stop mechanism 15. Grommet holes 27 are drill cut into the midpoint of the left margin of page 2 and pass through page 3. Alternatively, grommet holes 27 may be punched. The drill cut grommet holes 27 are placed at the top midpoint and bottom on page 2. The sliding insert 11 with the tab type stop mechanism 15 is placed between pages 2 and 3 with the tab type stop mechanism 15 situated between the top and midpoint grommet holes 27. Grommets 26 are inserted into the three grommet holes 27 and expanded. The insert moves between the top grommet 26 and the midpoint grommet 26 which serve as stop points for tab type stop mechanism 15 on the insert 11. Pages 2 and 3 are held together only by the grommets 26. Insert 11 cannot fall out or be pulled from sleeve 11. The insert is, however, vulnerable to tearing as pages 2 and 3 are not fastened completely together along their entire vertical length.

With reference now to FIG. 1A, a third method of manufacturing the calculator is described. In manufacturing the calculator, the calculator is scored to form a booklet. The scoring process in this method includes the folding under of a glue flap 14. The sliding insert 11 is designed without any stop mechanism. Glue flap 14 has no stop mechanism. Glue flap 14 is fastened to page 3 using a nylon reinforced double sided tape. One such tape is made by 3M Company of St. Paul, Minn. under model designation 3M-969. Insert 11 is placed in the sleeve formed by pages 2 and 3. Insert 11 rides on top of glue flap 14 or alternatively along side glue flap 14 when said glue flap is fastened to both pages 2 and 3. Insert 11 is held in place solely by friction. Insert 11 can be removed from the sleeve, it can drop out from the sleeve; and over time the friction fit will loosen from wear, thereby making insert 11 prone to falling out from the sleeve.

Figures 2, 2A:
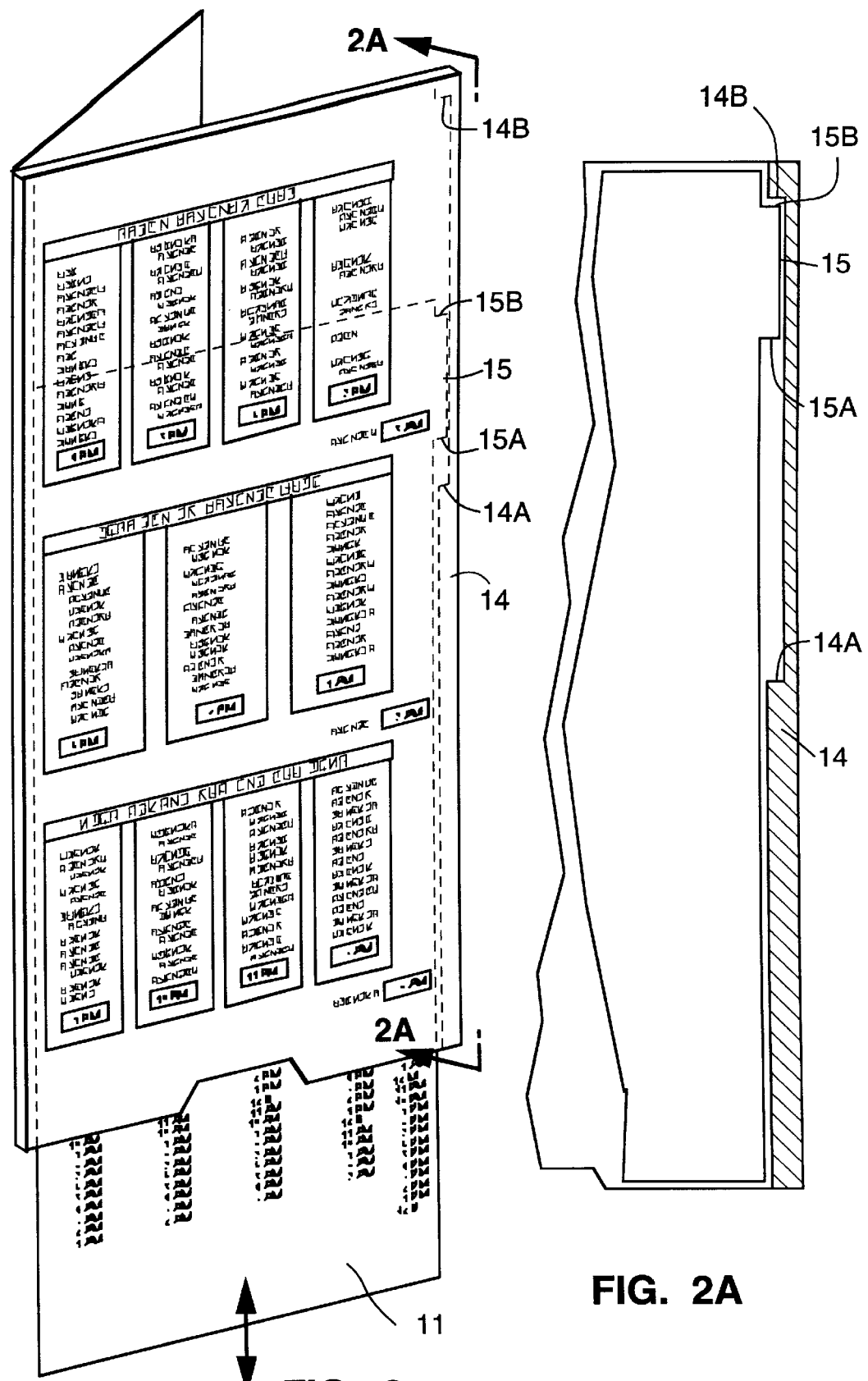
FIG. 2 is a plan view of the embodiment illustrated in FIG. 1, which illustrates a back side of the sleeve portion thereof, a vertical glue flap with a rectangular recessed die cut stop mechanism and a friction fit sliding insert with a tab type die cut stop mechanism.
FIG. 2A is a cross-sectional view taken along the line 2A—2A of FIG. 2, illustrating the sliding insert tab type die cut stop mechanism resting within the rectangular recessed die cut stop mechanism contained in the vertical glue flap.

Turning now to FIG. 1 and 2, a fourth method of manufacturing the calculator is described. In manufacturing the calculator, the calculator is scored to form a booklet. The scoring process in this method includes the folding under of a glue flap 14. Glue flap 14 has a rectangular recessed die cut stop mechanism 28 designed into it. The sliding insert 11 has a tab type die cut stop mechanism 15. The glue flap 14 is fastened to the underside of page 2 with nylon reinforces double sided tape. One such tape is made by 3M Company of St. Paul, Minn. under model designation number 3M-969. Insert 11 is placed between pages 2 and 3 in such a manner as to have the insert tab type stop mechanism 15 resting within the recessed die cut 28 on the glue flap 14. Glue flap 14 is then fastened to page 3 with nylon reinforced double sided tape. Insert 11 moves along the edge of glue flap 14. The tab type stop mechanism 15 prevents the insert 11 from moving beyond the confines of the recessed die cut 28 in the glue flap 14. Insert 11 cannot be dropped out or pulled from the sleeve.

Figure 6:
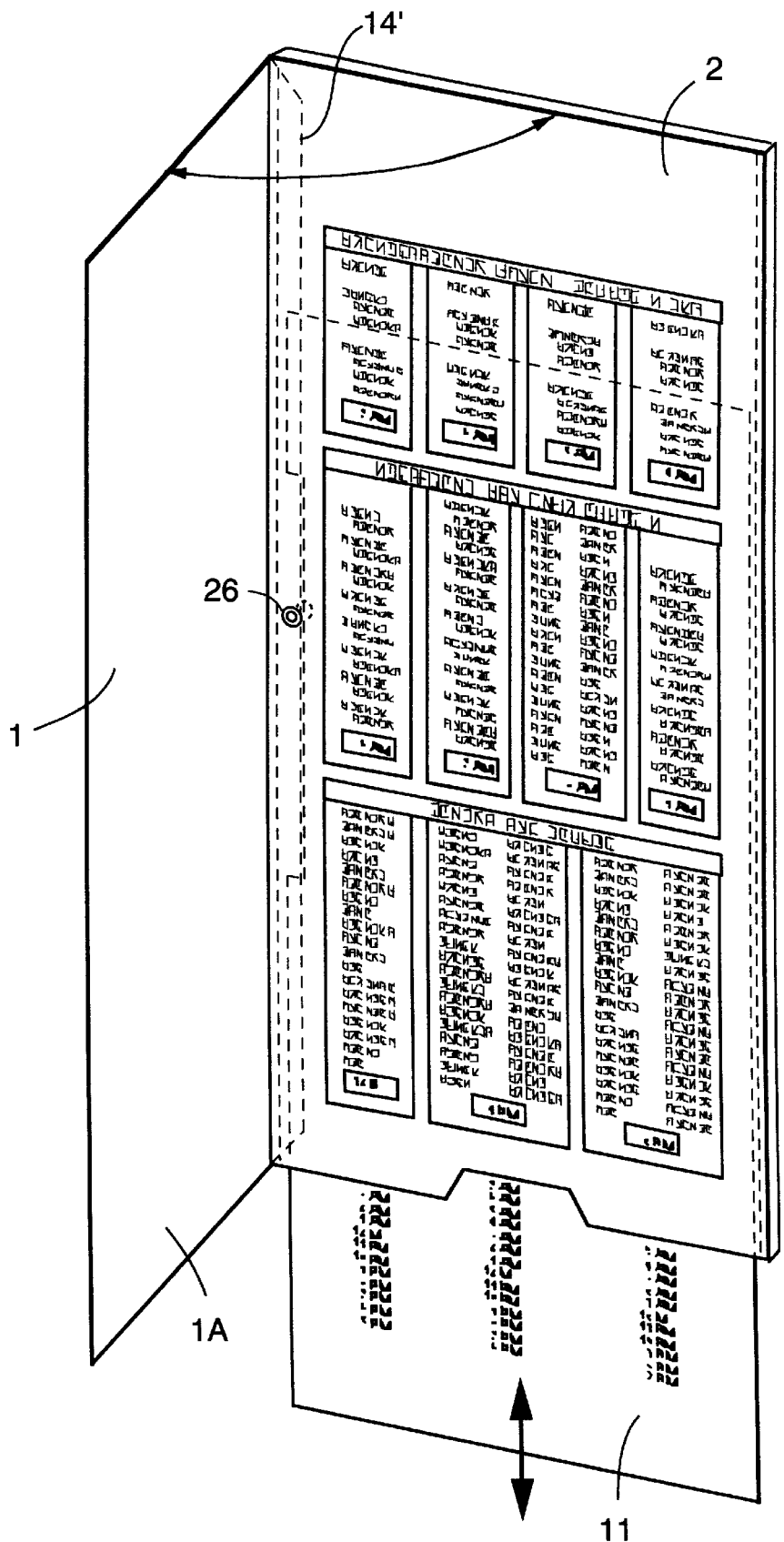
FIG. 6 is a plan view of an embodiment of the invention which illustrates a front side of the sleeve portion thereof, a full vertical length glue flap without a stop mechanism, a friction fit sliding insert containing a rectangular recessed die cut stop mechanism and a grommet inserted at the left midpoint of the page of the device. The grommet resides within the recessed die cut and operates as a stop mechanism.
Figures 7, 7A:
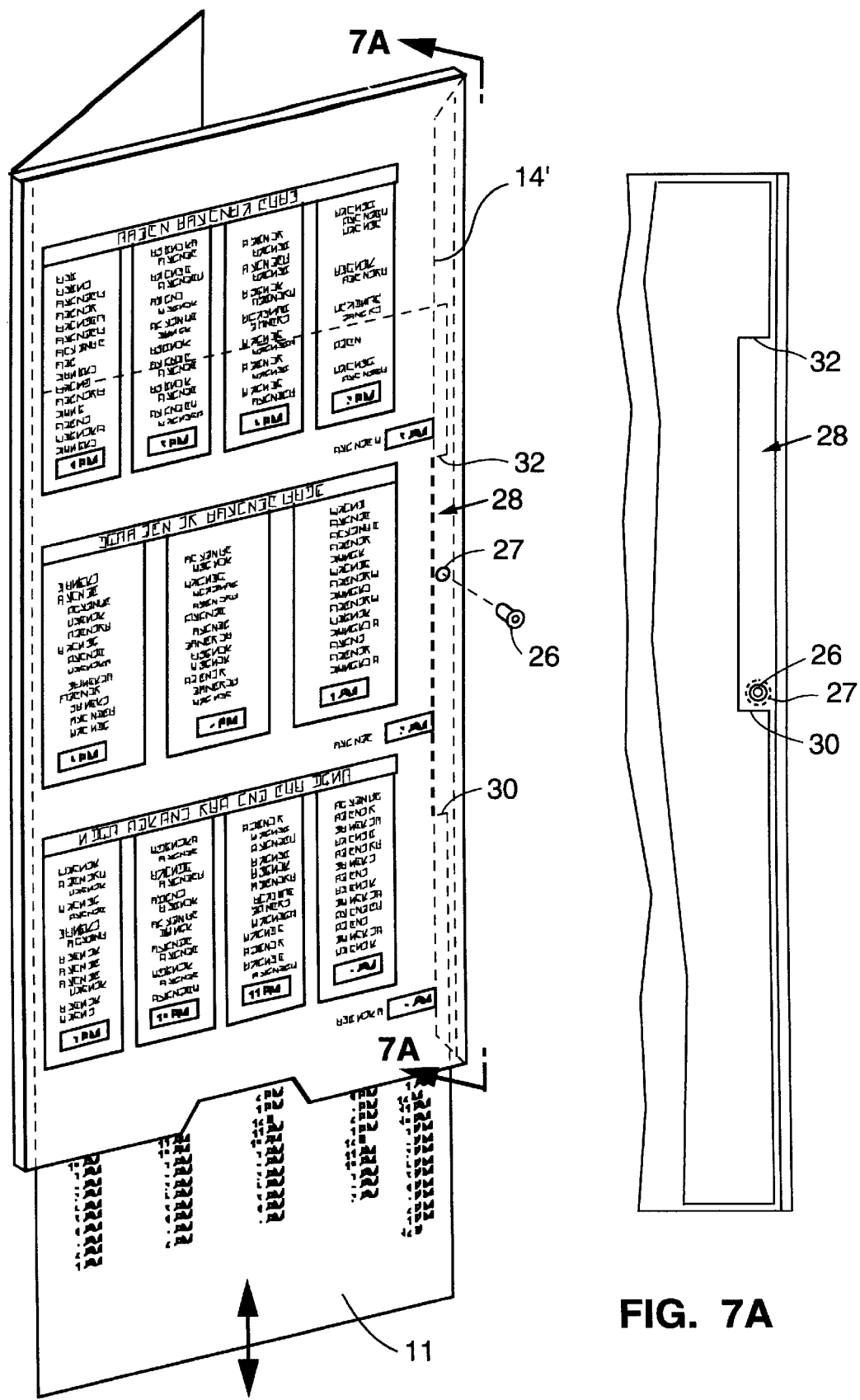
FIG. 7 is a plan view illustrating the back side of the sleeve portion of an embodiment of FIG. 6, a full vertical length glue flap without a stop mechanism, a friction fit sliding insert with a rectangular recessed die cut stop mechanism and a grommet which is inserted into a drill cut grommet hole at the midpoint of the page so that the grommet rests within the rectangular recessed die cut and acts as a stop mechanism.
FIG. 7A is a cross-sectional view taken along the line 7A—7A of FIG. 7, illustrating a recessed die cut stop mechanism and a midpoint of the page grommet stop mechanism.
Figure 8:
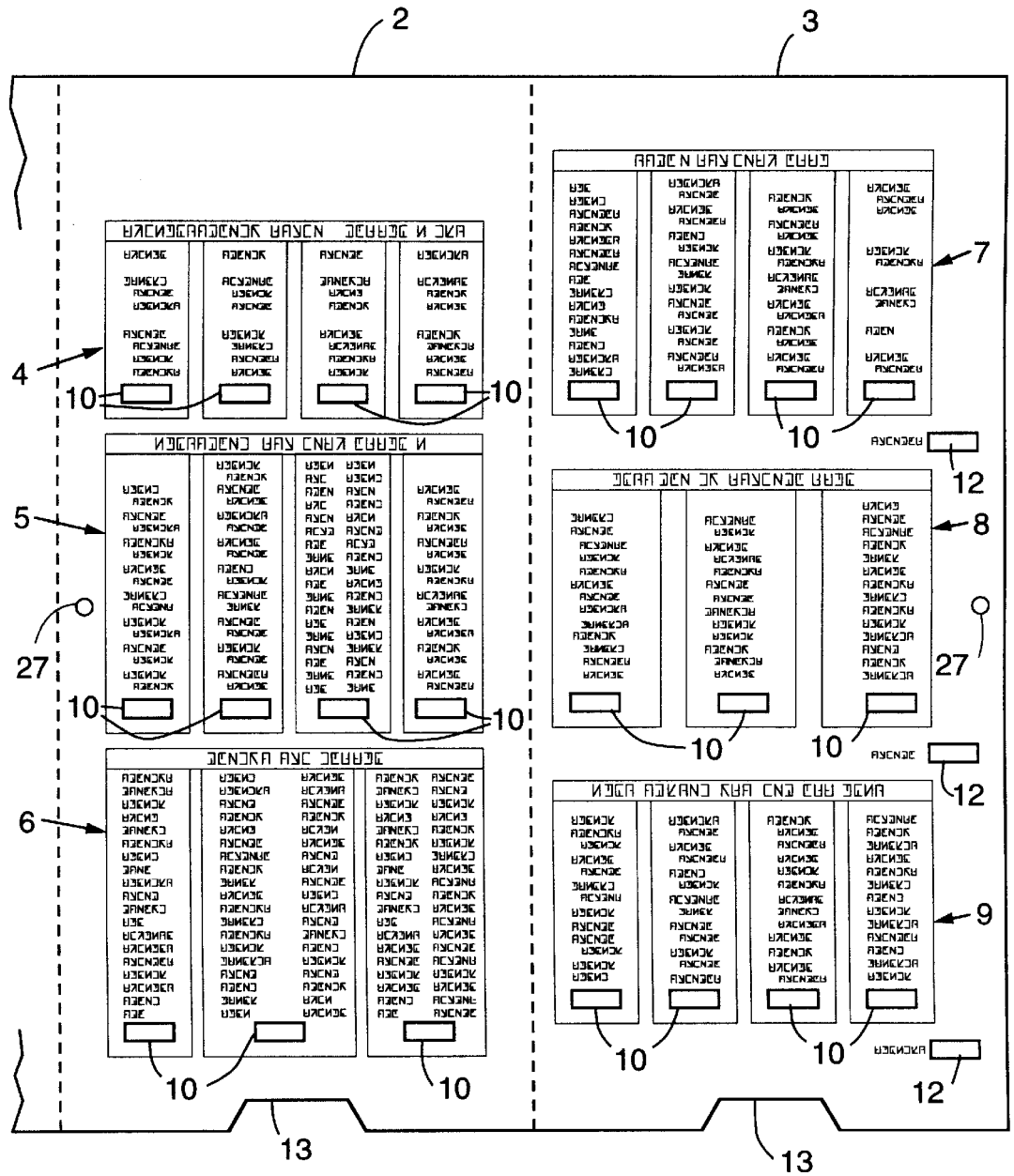
FIG. 8 is a plan view of the front and back sides of the sleeve portion of FIGS. 1 and 6, which illustrates the panel set configuration, the multiple die cut windows, the bottom cut outs for access to the sliding insert and the vertical midpoint drill cut grommet holes.

With reference now to FIGS. 6, 7 and 7A, a fifth method of manufacturing the invention is described. The calculator is scored to form a booklet. Included in the scoring process is the folding under of a glue flap 14'. In this fifth method, as illustrated, the width of glue flap 14' is slightly larger than the width of glue flap 14 of FIG. 1A. Glue flap 14' does not contain a stop mechanism. The sliding insert 11 used has a recessed die cut stop mechanism 28. The glue flap 14' is fastened only to page 3 with nylon reinforced double sided tape. One such tape is made by 3M Company of St. Paul, Minn. under model designation number 3M-969. The insert 11 is cut to provide an optimal friction fit. Insert 11 rides on top of the glue flap 14' which is fastened to page 3. A single grommet hole 27 is drill cut through page 2, glue flap 14' and page 3. The grommet hole 27 is placed at the midpoint of the left margin of page 2 and at the vertical midpoint of page 2. Insert 11 is placed in the sleeve between pages 2 and 3. The grommet 26 is inserted through page 2, the space provided in the insert recessed die cut 28 and page 3. The grommet 26 is then expanded. Insert 11 cannot be pulled from the sleeve, be lost inadvertently or drop out due to loosening of the friction fit.

Figure 4A:
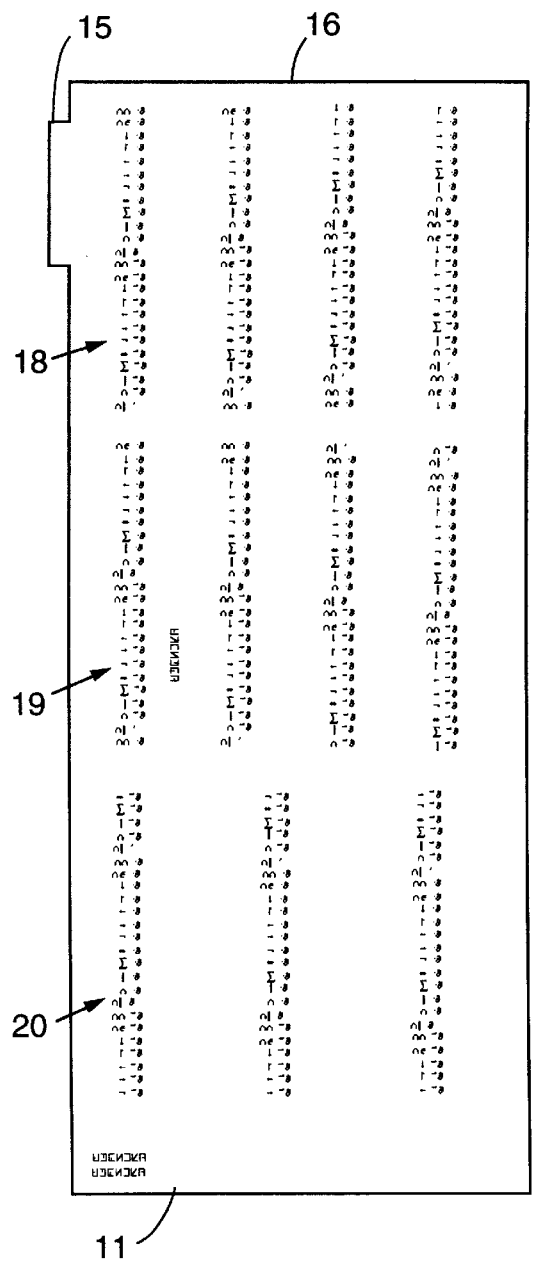
FIG. 4A is a plan view of the front side of the friction fit sliding insert of an embodiment of the invention, illustrating the longitudinally disposed row configuration of incremental time designations and a tab type die cut stop mechanism.
Figure 4B:
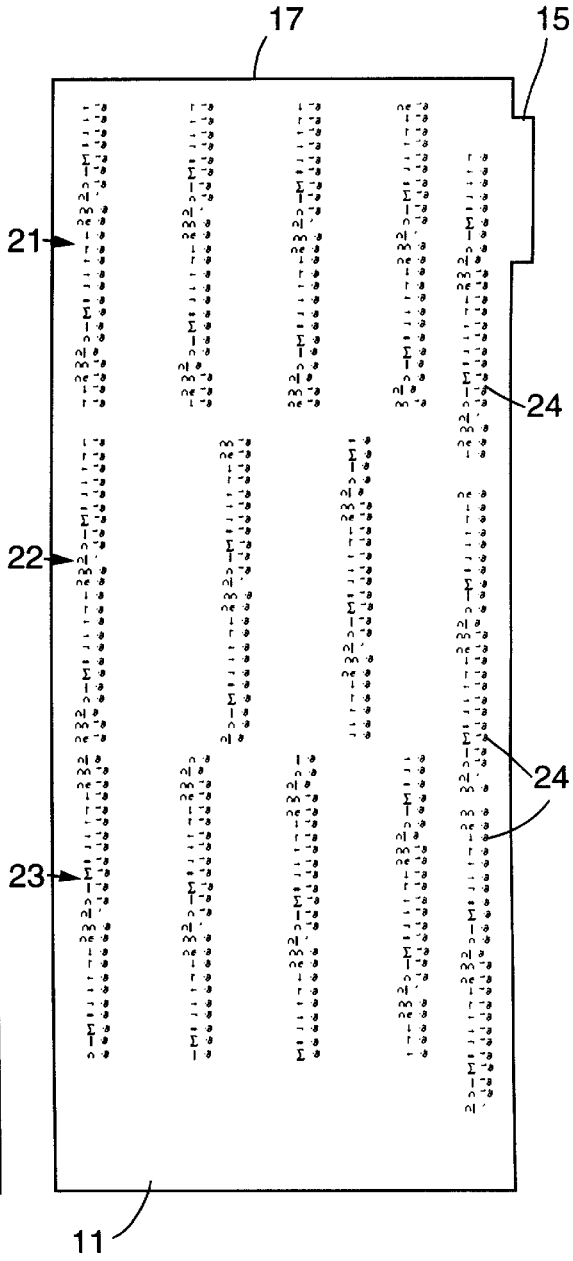
FIG. 4B is a plan view of the back side of the insert of an embodiment of the invention, illustrating the longitudinally disposed row configuration of incremental time designations and a tab type die cut stop mechanism.
Figure 5:
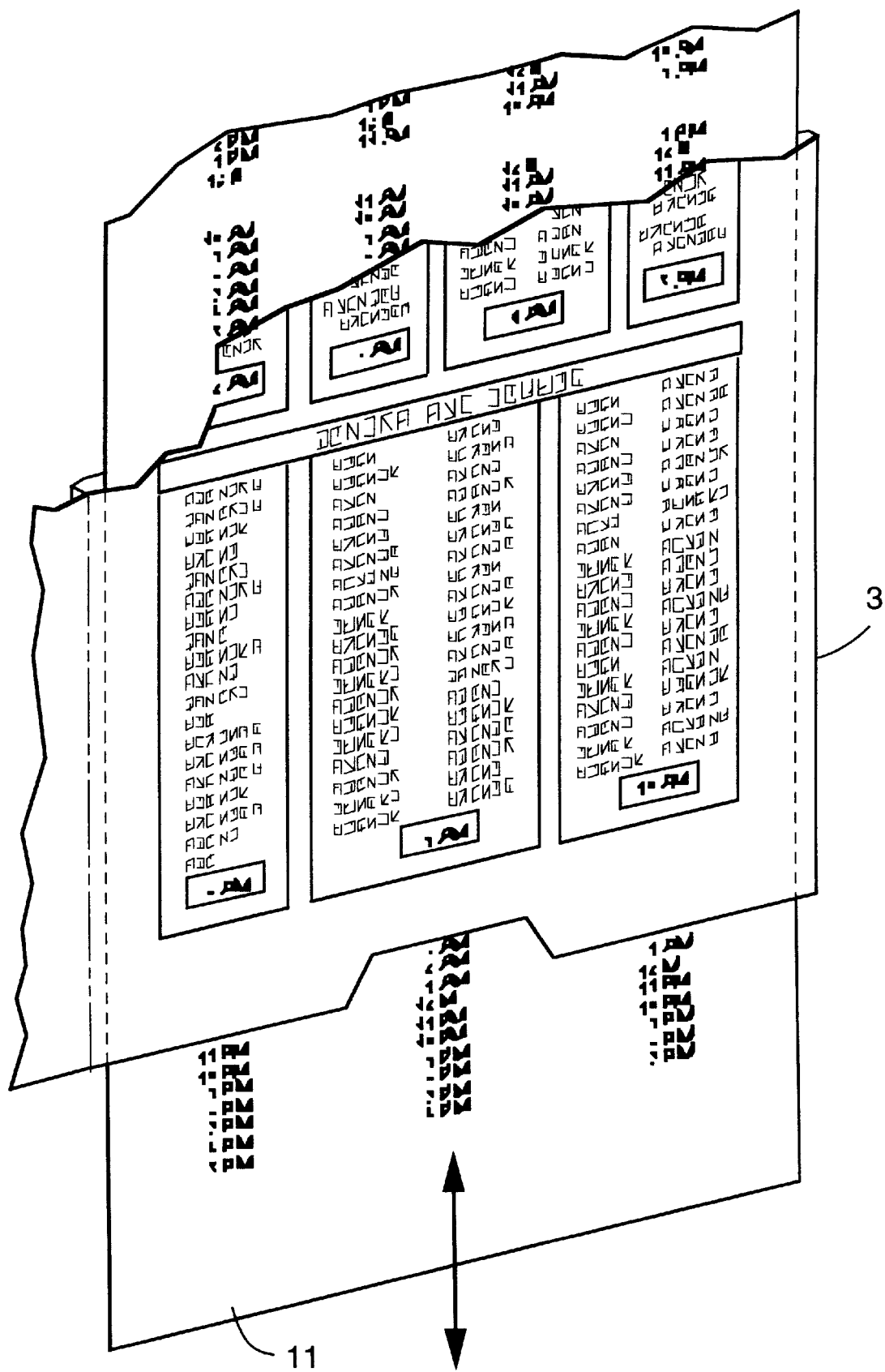
FIG. 5 is a cut-away view of the sleeve portion of an embodiment of the invention, illustrating an arrangement for obscuring excess time designations.

With reference to FIGS. 4A and 4B, insert 11 is described in further detail. Insert 11 has printed on both its sides, time figure columns and various legal notices. The time figure columns on insert 11 appear in one color for the same day, and another color for time the next day, e.g., black for the same day and red for time the next day. In one embodiment of the invention insert 11 is 9 and ⅝ inch by 4 and ¼ inch. In order to provide a stop corner except for the extension provided by stop corner 15, the width is reduced to 3 and ¾ inch. Thus, when insert 11 hits the edges of the glue flap 14, insert 11 is prevented from sliding beyond its useful information range. In further detail, this serves two purposes. First, it keeps insert 11 from moving too far and aligns it with each set of times for the panel sets. Second, it also prevents insert 11 from sliding out of page 2 of the calculator.

Referring now to FIG. 4A, on a first side 16 there are four time columns 18 for US and Canada with the time zones set moving from left to right for PACIFIC STANDARD TIME, MOUNTAIN STANDARD TIME, CENTRAL STANDARD TIME, and EASTERN STANDARD TIME. Each time column covers a specific standard time zone. Thus, for example, with insert 11 in place and prior to any movement of insert 11 from an initial resting position, the times in the windows 10 for the four panels 4 from left to right will be: 9 AM; 10 AM; 11 AM; and 12 N.

On the first side 16, there are also four time columns 19 for the Caribbean and Latin America. Each time column covers a specific standard time zone. Thus, for example, with insert 11 in place and prior to any movement of insert 11 from the initial resting position, the times in the windows 10 for the panels 5 from left to right will be: 11 AM; 12 N; 1 PM; and 2 PM.

On the first side 16, additionally there are three time columns 20 for Africa, Europe and the Middle East. Each time column covers a specific standard time zone. Thus, for example, with insert 11 in place, and prior to any movement of insert 11 from the initial resting position, the times in the windows 10 for the panels 6 from left to right will be: 5 PM; 6 PM; and 7 PM. Various legal notices are included between the second and third time columns on insert 11.

Referring now to FIG. 4B, (on the second side 17) for EAST AFRICA, ASIA AND THE NEAR EAST there are four time columns 21. Each time column covers a specific standard time zone. Thus, for example, with insert 11 in place, and prior to any movement of insert 11 from the initial resting position, the times in the windows 10 for the panels 7 as shown in FIG. 3 from left to right will be: 8 PM; 9 PM; 10 PM; and 11 PM.

For ASIA AND SOUTH EAST ASIA, there are three time columns 22. Each time column covers a specific standard time zone. Thus, for example, with insert 11 in place, and prior to any movement of insert 11 from the initial resting position, the times in the windows 10 for the three panels 8 from left to right will be: 10:30 PM; 12 M; and 5 AM (Red).

For ASIA PACIFIC AND THE FAR EAST, there are four time columns 23. Each single text panel covers a specific standard time zone. Thus, for example, with insert 11 in place, and prior to any movement of insert 11 from the initial resting position, the times in the windows 10 for the four panels 9 from left to right will be: 1 AM (Red); 2 AM (Red); 3 AM (Red); and 7 AM (Black). Various legal notices are included between the last panel set of numbers and the bottom of the insert slide and between the time columns on the insert slide.

US STANDARD TIME ZONES-THREE

For US Standard Time Zones, there are three time columns 24. These are positioned down the length of the insert 11. Thus, for example, with insert 11 in place, and prior to any movement of insert 11 from the initial resting position, the times in the windows from top to bottom will be: 9 AM; 11 AM; and 12 N.

With reference now to FIGS. 1, 1A, 1B, 1C, 2, 2A, 3 and 5, the operation of the calculator is described in further detail. First, a user selects the geographic region, panel and column in the country/dependency/city where he or she is situated. Second, the user slides insert 11 until the closest hour representing the actual standard time in the user's location appears in the window 10 at the bottom of the selected text panel. Third, the user locates the geographic region of the world 4, 5, 6, 7, 8 or 9 where the country/dependency/city of interest is located; and, within that geographic region locates the panel and column containing the name of the country/dependency/city of interest. Fourth, the reader then reads out the local standard time which appears in the window 10 at the bottom of the text panel containing the name of the country, dependency or city of interest. Fifth, if there is a single cross (†) or a twin cross (††) Daylight Savings Time designation after the name of the country, dependency or city of interest, the user checks instructions at the top of page 3 of the device to ascertain if Daylight Savings Time is applicable. If it is applicable, the user adds one hour to the time that appears in the window 10 of the text panel containing the country, dependency or city of interest.

In addition to the above, the device allows the users in Canada and/or the United States to calculate local standard time world wide from within four of the major standard time zones in Canada and the United States, both of which are multiple time zone countries. Conversely, the device also allows users interested in obtaining local standard time in Canada and the United States to obtain local standard time in four separate major time zones in each country. There is only a slight variation in the operation of the device with respect to Canada and the United States.

In the first step, the user located in Canada or the United States selects not only the country where situated but also the time zone where he or she is located. In step two, the user slides insert 11 until the closest hour representing the actual standard time in the users location appears in the window 10 at the bottom of the column on which is printed the selected time zone. If the user does not know the time zone in which he or she is located, the user can generally ascertain the appropriate time zone from representative cities specified under each time zone for both Canada and the United States. For the user outside of Canada and the United States, the standard operation applies except that in the third step, the user can determine local standard time either by reference to the specific time zone of interest or generally determine the time zone of interest by the representative cities set out under each time zone for Canada and the United States. The local standard time, of course, appears in the window 10 at the bottom of the appropriate column. If the user selects a panel located on page 3, the user can confirm, through the appropriate window 12 that the correct Canadian or United States local standard time in three Canadian and USA time zones has been selected without returning to page 2.

It should be noted that once the user sets the time for his or her present location, then the local standard time in every country in the world and all of the dependencies and cities listed in the charts have been calculated and are available merely by looking in the time display windows 10 under the panels of the countries, dependencies or cities. Once the user has determined the time in the country/dependency/city of interest, the user then repositions insert 11 completely within the sleeve portions, then folds the cover page 1 over page 2, and the time calculation is thus completed.

With reference now to FIGS. 6, 7, 7A, 8, 9A and 9B, an alternative embodiment of the present invention is described in detail. Since such figures correspond to FIGS. 1, 1A, 1B, 1C, 2, 2A, 3, 4A, 4B and 5, only differences between such figures are described. In this alterative embodiment, a fastener, more specifically, a grommet 26 is utilized to prevent insert 11 from inadvertently sliding out from sleeve 2, either during use or during storage or transport of the calculator or as a result of the friction fit loosening over time due to wear. As illustrated in FIG. 7A, the stop mechanism utilizes a recess, more specifically, rectangular die cut 28 approximately ½ inch wide and 3.5 inches long, made in this case on the left side of insert 11. It will be understood by those having skill in the art that the rectangular die cut 28 could also be made on the right side of insert 11. It will also be understood by those having skill in the art that the die cut may be shaped other than as a rectangle. The rectangular die cut 28 is not self-contained, and as such its location depends upon the selected location of the stop mechanism, as further explained below. In this embodiment of the invention, the rectangular die cut 28 is located on the left side of insert 11, at the (vertical) midpoint of insert, and also at the midpoint between the edge of insert 11 and the nearmost panel.

In fabricating the stop mechanism a grommet hole 27 is drill cut. The grommet hole 27 is located at page 2 at the left side of the page 2 at the page midpoint. The grommet hole 27 is also centered in the border portion of page 2 between the left edge of the page and the panel sets. The grommet hole 27 passes through page 2, the space provided by the recess die cut, the glue flap 14 and page 3. The grommet 26, which is preferably metallic, is hollow centered, preferably ¼ in diameter (although smaller diameter grommets may be used), and is mounted within the grommet hole 27 to function, together with the rectangular die cut 28, as a stop mechanism for insert 11 to prevent insert 11 from falling out or being taken out from the sleeve.

In further detail, to assemble the stop mechanism, insert 11 having a rectangular die cut 28 (one side open) is inserted into sleeve 2. The grommet 26 is then inserted to pass through page 2, the space provided by the rectangular die cut 28, the glue flap 14 and page 3. The grommet 26 is then expanded to secure grommet 26 in place. A bottom stop 30 of the rectangular die cut 28 positions insert at rest within the sleeve at an appropriate time in each time column. A top stop 32 of the rectangular die cut 28 positions insert 11 at the last sets of times available from each column. The bottom stop 30 and the top stop 32 establish boundaries for the movement of insert 11. In order to indicate that insert 11 is either at rest or has been positioned to exceed all numerical columns, a red bar may be placed or printed to appear in the windows 10. This feature provides an appearance of opening the "eyes" of the calculator, and also provides some buffer space in regard to the data conveyed by the calculator. Furthermore, the red bar provides an indication that the calculator has been correctly assembled.

Returning to the grommet 26, in this embodiment of the invention, the grommet 26 is inserted into the grommet hole 27 such that the larger side of the grommet 26 becomes flush with the back side of the calculator. In further detail, a front face of the grommet 26 rises about 1/16 inch from the surface of page 2. When the front cover page 1 is closed, an impression mark shows through rather quickly. Because the back side of the grommet 26 has a minimal intrusion, reversing the position of the grommet 26 by inserting the grommet 26 from the back side of the calculator, provides a smaller degree of intrusion, which results in a minimal, if any, impression mark, appearing through the cover of the calculator.

Figures 9A, 9B:
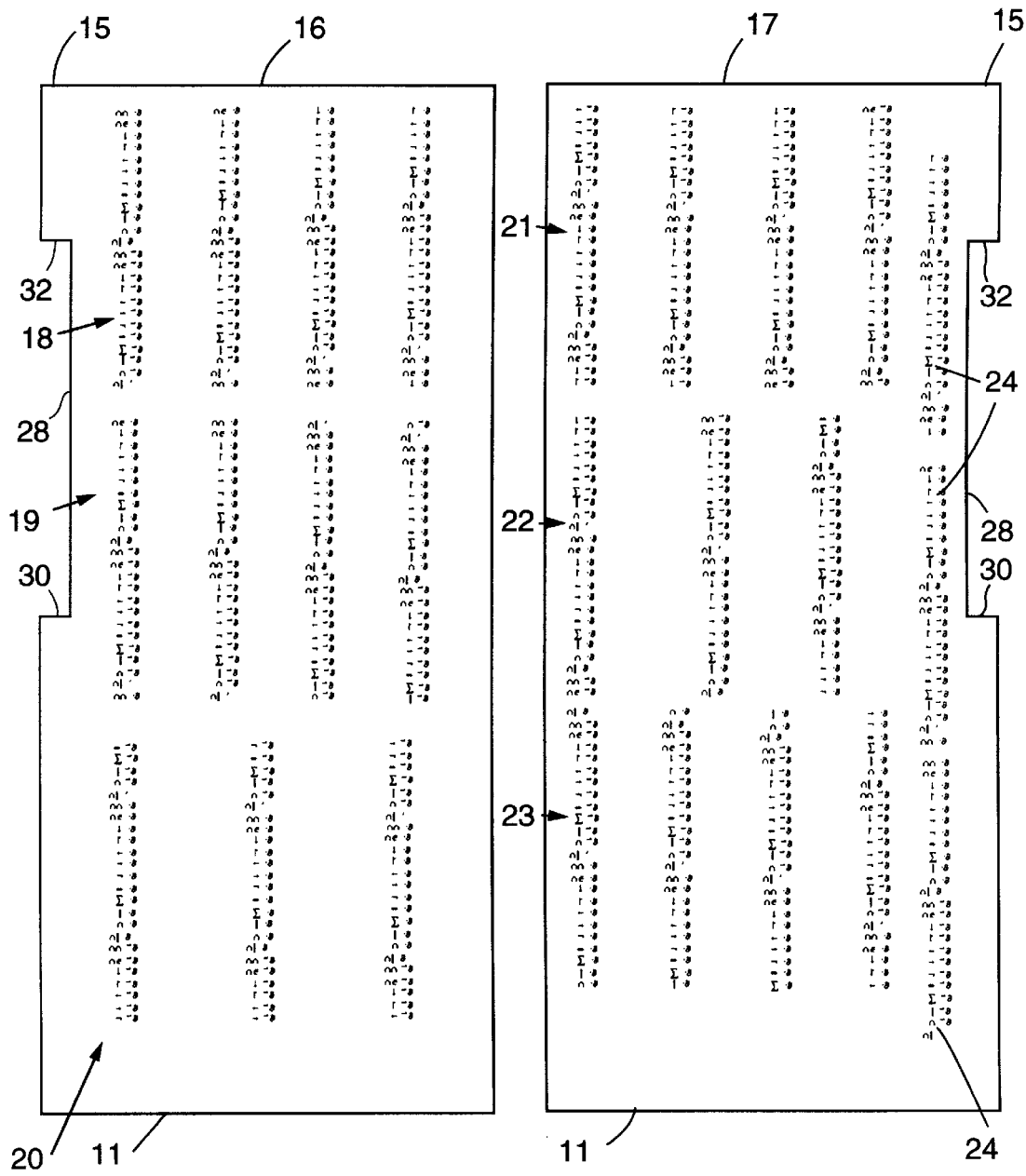
FIG. 9A is a plan view of the front side of the sliding insert of the embodiment of FIG. 6, illustrating the longitudinally disposed row configuration of incremental time designations and the rectangular recessed die cut stop mechanism.
FIG. 9B is a plan view of the back side of the sliding insert of the embodiment of FIG. 6, illustrating the longitudinally disposed row configuration of incremental time designations and the rectangular recessed die cut stop mechanism.

As illustrated in FIGS. 9A and 9B, insert 11 includes a recessed rectangular die cut 28, which when located within sleeve 2, operates with grommet 26 to prevent insert 11 from moving beyond the limits imposed by bottom stop 30 and top stop 32 of rectangular die cut 28.

In operation, when insert 11 moves within sleeve 2, when the bottom stop 30 or top stop 32 of die cut 28 abuts against grommet 26 it thereby prevents insert 11 from travelling beyond the limits set by ends 30 and 32. In this way, insert 11 is prevented from sliding out beyond the confines of sleeve 2.

Figure 13G:
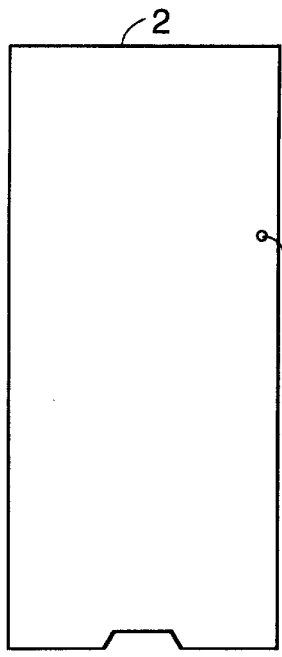
FIGS. 13A–13O illustrate alternative placements for the die cut grommet holes and grommets on the first chart page.
Figure 13H:
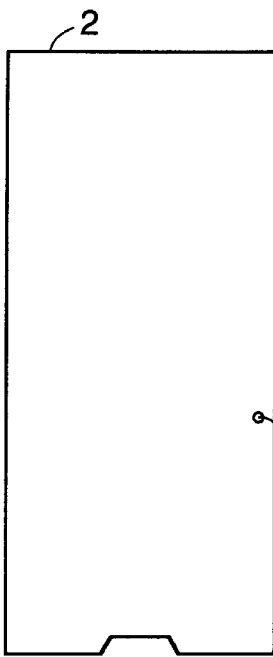
Figure 13I:
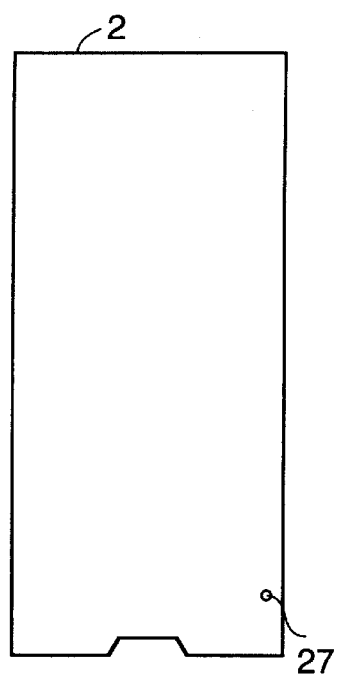

With reference now to FIGS. 13A through 13O, FIGS. 14A through 14O and FIGS. 15A through 15I, while grommet 26 is illustrated in the drawings as being positioned in a specific location, such grommet 26 may be positioned in other locations. In addition, two grommets may be utilized together with dual left and right rectangular die cuts 28 as illustrated in FIGS. 13M, 13N and 13O.

In further detail, the grommet 26, grommet hole 27 and rectangular die cut 28' may be positioned on the left side (i.e., adjacent to the junction of first page 1 and following page 2) of the calculator in a variety of manners, as now described. In FIGS. 14A and 15A the rectangular die cut 28' is positioned at the top left and is 2.6 inch by ¼ inch in size and is positioned approximately ½ inch from the top margin and approximately ¼ inch from the left margin. In FIG. 13A the grommet hole 27 is positioned approximately 3 inches from the top margin and also ¼ inch from the left margin. The grommet 26 is inserted through page 2 grommet hole 27, the 2.6 inch rectangular die cut 28 in insert and the page 3 grommet hole 27. The grommet 26 is therefore placed at the bottom of the rectangular die cut 28' on insert to allow the insert adequate slide room.

Figure 14M:
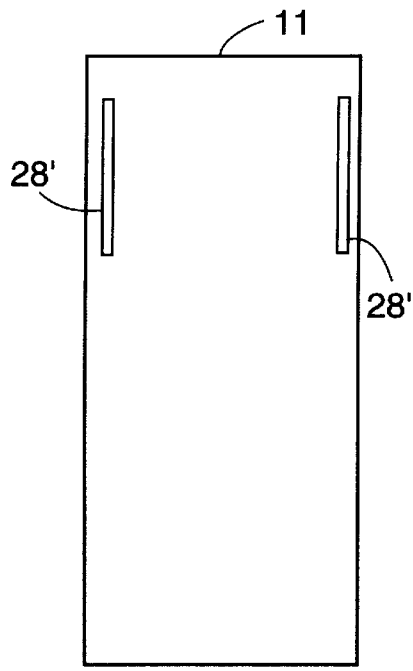
FIGS. 14A–14O illustrate alternative placements for self-contained rectangular die cut stop mechanisms on the sliding insert.
Figure 15A:
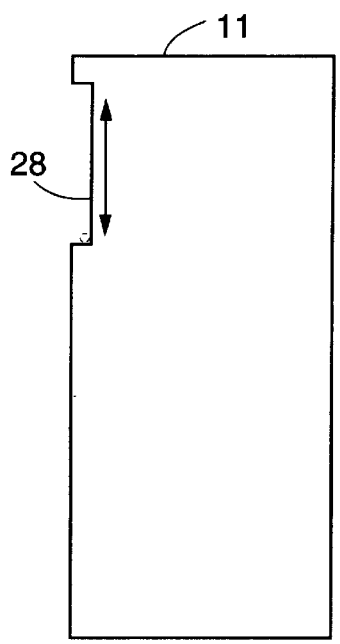
Figure 15B:
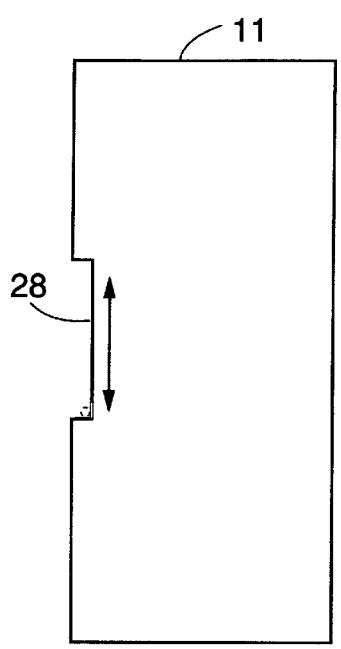

As illustrated in FIGS. 14B and 15B, a second embodiment of a left side positioned stop mechanism consists of a 2.6 inch by ¼ inch rectangular die cut 28' may be positioned at the left midpoint of insert 11 approximately 3 inches from the top margin and approximately ¼ inch from the left margin. As illustrated in FIG. 13B, the grommet hole 27 is positioned approximately 6 inches from the top margin and also ¼ inch from the left margin. The grommet 26 is then inserted through the page 2 grommet hole 27, the rectangular die cut 28' of insert 11 and the page 3 grommet hole 27. In this embodiment, the grommet placement is at the bottom of the 2.6 inch rectangular die cut 28' on insert 11 to allow the insert adequate slide room.

Figure 15C:
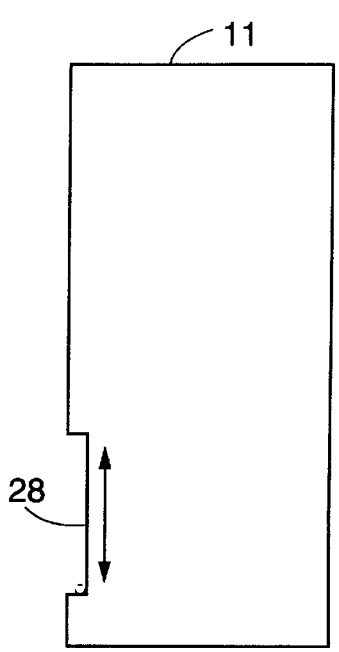

As illustrated in FIGS. 14C and 15C, a third embodiment of a left side positioned stop mechanism consists of a 2.6 inch by ¼ inch rectangular die cut 28' at the bottom left of insert 11, approximately 9 inches from the top margin and approximately ¼ inch from the left margin. The grommet hole 27, as illustrated in FIG. 13C, is placed approximately 9 inches from the top margin and also ¼ inch from the left margin. The grommet 26 is then inserted through the page 2 round die cut hole, the 2.6 inch rectangular die cut 28' and the page 3 grommet hole 27. In this embodiment, the grommet placement is at the bottom of the 2.6 inch rectangular die cut 28' on the insert to allow insert 11 adequate slide room.

Figure 15D:
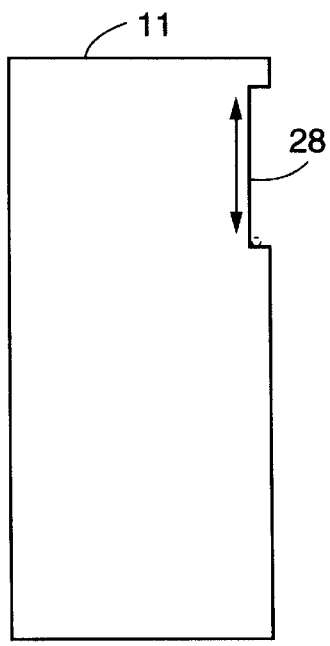

Alternatively, the rectangular die cut 28' on insert 11, the grommet 26 and grommet hole 27 may be positioned on the right side of the calculator as shown in FIGS. 14G, 14H and 14I. In further detail, and as illustrated in FIGS. 14C and 15D, a 2.6 inch by ¼ inch rectangular die cut 28' is positioned at the top right of insert 11 approximately ½ inch from the top margin and approximately ¼ inch from the right margin. As illustrated in FIG. 13G, the grommet hole 27 is placed approximately 3 inches from the top margin and also ¼ inch from the right margin. The grommet 26 is then inserted through the page 2 round die cut, the 2.6 inch rectangular die cut 28' in the insert and the page 3 round die cut. The grommet placement is at the bottom of the 2.6 inch rectangular die cut 28' on the insert to allow the insert adequate slide room.

Figure 15E:
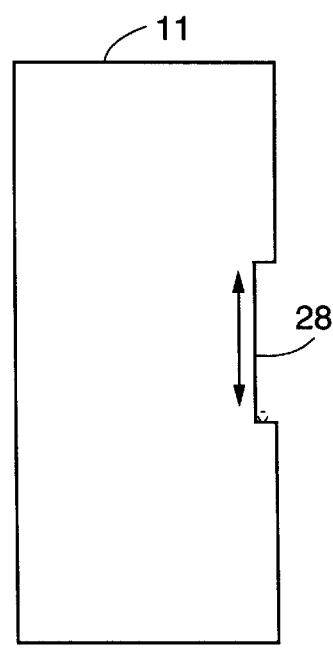

As illustrated in FIGS. 14H and 15E, a second embodiment of a right side positioned stop mechanism consists of a 2.6 inch by ¼ inch rectangular die cut 28' at the right midpoint of insert 11 approximately 3 inches from the top margin and approximately ¼ inch from the right margin. The chart page grommet hole 27 is placed approximately 6 inches from the top margin and ¼ inch from the right margin. As illustrated in FIG. 13H, the grommet 26 is then inserted through the page 2 round die cut hole, the 2.6 inch rectangular die cut 28' in insert 11 and the page 3 round die cut. The grommet placement is at the bottom of the 2.6 inch rectangular die cut 28' on insert 11 to allow the insert adequate slide room.

Figure 15F:
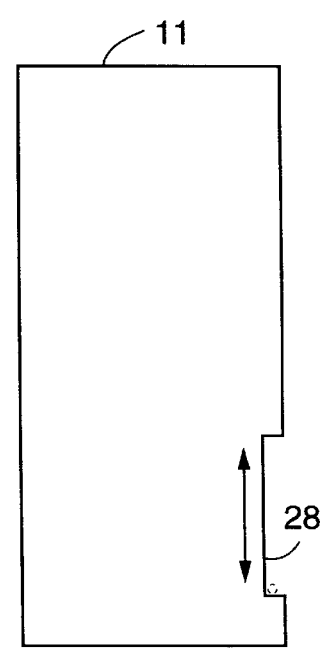

As illustrated in FIGS. 14I and 15F, a third embodiment of a right side positioned stop mechanism consists of a 2.6 inch by ¼ inch rectangular die cut 28' at the bottom right of insert 11 approximately 9 inches from the top margin and approximately ¼ inch from the right margin. The chart page grommet hole 27 is placed approximately 9 inches from the top margin and also ¼ inch from the right margin. The grommet is then inserted through the page 2 grommet, the 2.6 inch rectangular die cut 28' in the insert and the page 3 grommet hole 27. As illustrated in FIG. 13I, the grommet placement is at the bottom of the 2.6 inch rectangular die cut 28' on the insert to allow the insert adequate slide room.

As an yet another alternative, the stop mechanism may be placed in the (horizontal) middle of the calculator. As illustrated in FIG. 13D and now explained in further detail, in accordance with a first embodiment of such a middle placement stop mechanism as illustrated in FIG. 14D, a 2.6 inch by ¼ inch rectangular die cut 28' at the top middle of the insert 11 is positioned approximately ½ inch from the top margin and centered between left and right margins. As illustrated in FIG. 13D, the chart page grommet hole 27 is approximately 2.6 inches from the top margin and would also be centered between left and right margins. The grommet is then inserted through the round page 2 grommet hole 27, the 2.6 inch rectangular die cut 28' in the insert 11 and the page 3 grommet hole 27. The grommet placement is at the bottom of the 2.6 inch rectangular die cut 28' on the insert to provide the insert adequate slide room.

As illustrated in FIG. 14E, a second embodiment of a middle positioned stop mechanism consists of a 2.6 inch by ¼ inch rectangular cut at the middle of the insert 11, approximately 6 inches from the top margin and centered between left and right margins. As illustrated in FIG. 13E, the chart page grommet hole 27 is positioned approximately 6 inches from the top margin and is also centered between left and right margins. The grommet 26 is then inserted through the top chart grommet hole 27, the 2.6 inch rectangular die cut 28' in the insert and the page 3 grommet hole 27. The grommet placement is at the bottom of the 2.6 inch rectangular die cut 28' on the insert to allow the insert adequate slide room As illustrated in FIG. 14F, a third embodiment of a middle positioned stop mechanism consists of a 2.6 inch by ¼ inch rectangular die cut 28' at the bottom middle of the insert approximately 9 inches from the top margin and centered between left and right margins. The grommet hole 27 is placed approximately 9 inches from the top margin and centered between left and right margins. As illustrated in FIG. 13F, the grommet 26 is then inserted through the page 2 grommet hole 27, the 2.6 inch rectangular die cut 28' in the insert and the page 3 grommet hole 27. The grommet placement is the bottom of the 2.6 inch rectangular die cut 28' on the insert to allow the insert adequate slide room.

Figure 13J:
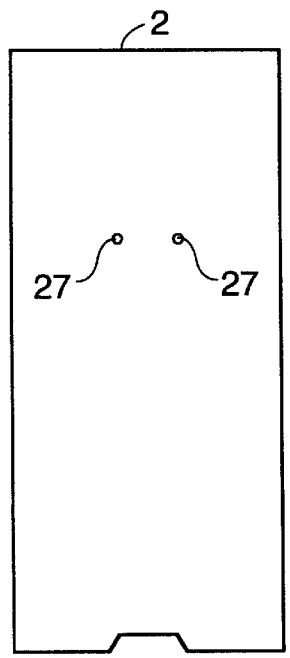
Figure 13K:
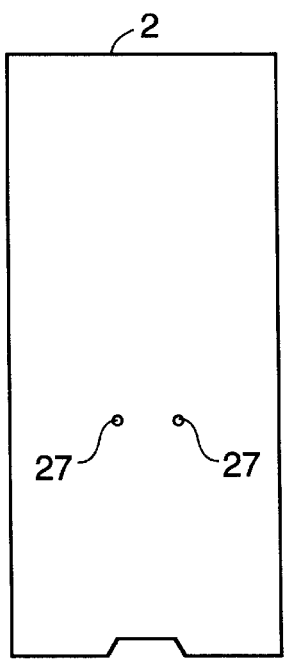
Figure 13L:
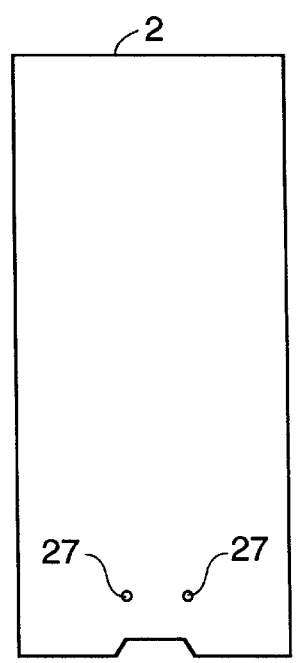
Figure 13M:
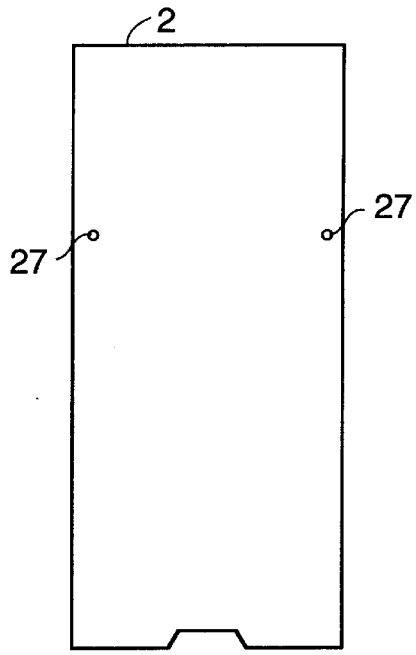
Figure 13N:
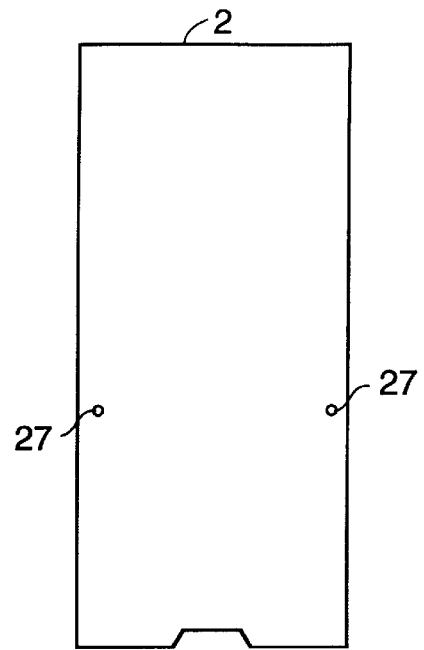
Figure 13O:
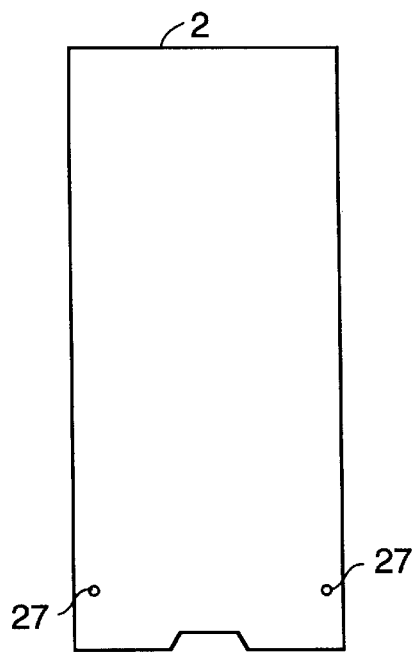
Figure 14N:
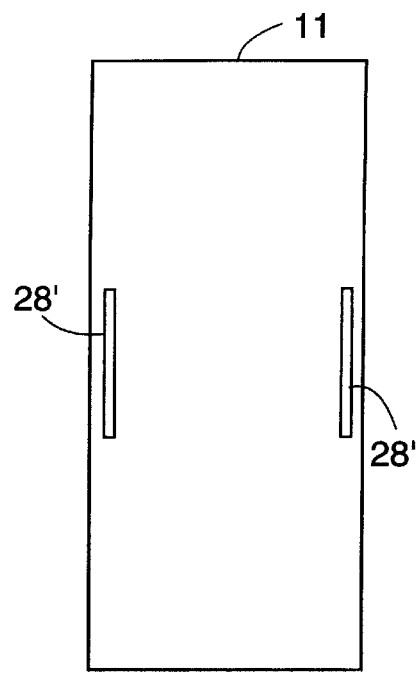
Figure 14O:
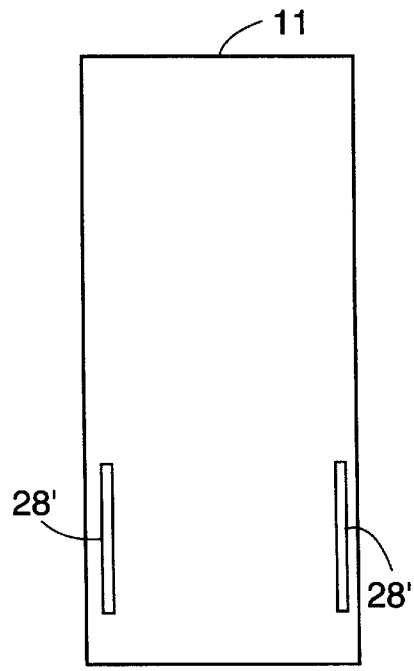

Referring now to FIGS. 13J, 13K, 13L, 14J, 14K and 14L, further embodiments are now explained. The insert stop mechanism may utilize dual die cuts which are left and right of the (horizontal) middle of the insert. As illustrated in FIGS. 14J, 14K and 14L, such an embodiment consists of dual 2.6 inch by ¼ inch rectangular die cuts 28' positioned between the first and second and the third and fourth number columns on the insert 11 together with corresponding drill cut grommet hole locations on the chart pages as illustrated in FIGS. 13J, 13K and 13L. Further, and as illustrated in FIGS. 14M, 14N and 14O, the rectangular die cuts on the insert may be in the same positions as the alternatives given above, but situated at the right side and the left side of the insert. Alternatively, the die cuts 28 may be recessed as illustrated in FIGS. 15G, 15H and 15I, respectively.

Once the insert 11 is inserted into the sleeve, a small metal or composite grommet 26 is inserted so that it passes through the first chart page grommet hole 27, the 2.6 inch rectangular die cut 28 slot in the insert 11, and the second chart page grommet hole 27. In this manner the insert 11 is permanently placed within the device but slides the necessary distances to display the time with the grommet 26 being the permanent stop post for the bottom and top of the rectangular die cut 28. It is extremely important to note that the single or dual grommets used are only used as the anchor column(s) and not for purposes of holding the pages together. As illustrated in FIGS. 1B and 1C, other embodiments of the invention which are described herein use the grommets to fasten and hold page 2 and 3 together. The grommet cylindrical column (the portion between the two splayed ends of the grommet 26) must be precisely sized to prevent the friction slide from sticking and making the insert difficult to slide. It must also not be too loose and look sloppy.

Figure 10:
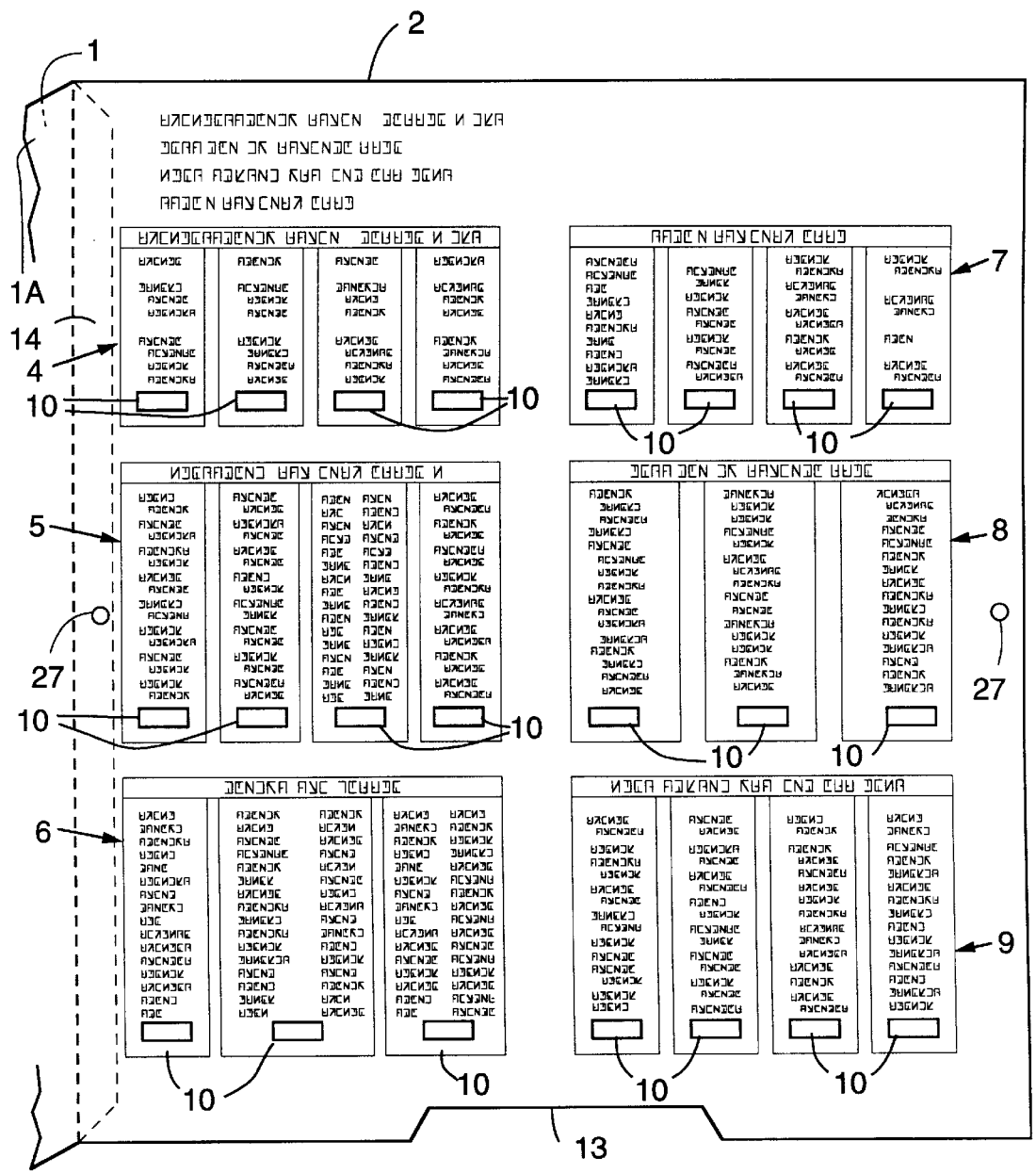
FIG. 10 is a plan view of an 8½ inch×11 inch alternative embodiment of the invention, which illustrates a front side of the sleeve thereof, a full left side vertical length glue flap, all panel set configurations combined on one front chart page, two drill cut grommet holes, one each at the right and left sides of the page at the midpoints, and a single cut out at the bottom of the page to provide access to the friction fit sliding insert.
Figure 10A:
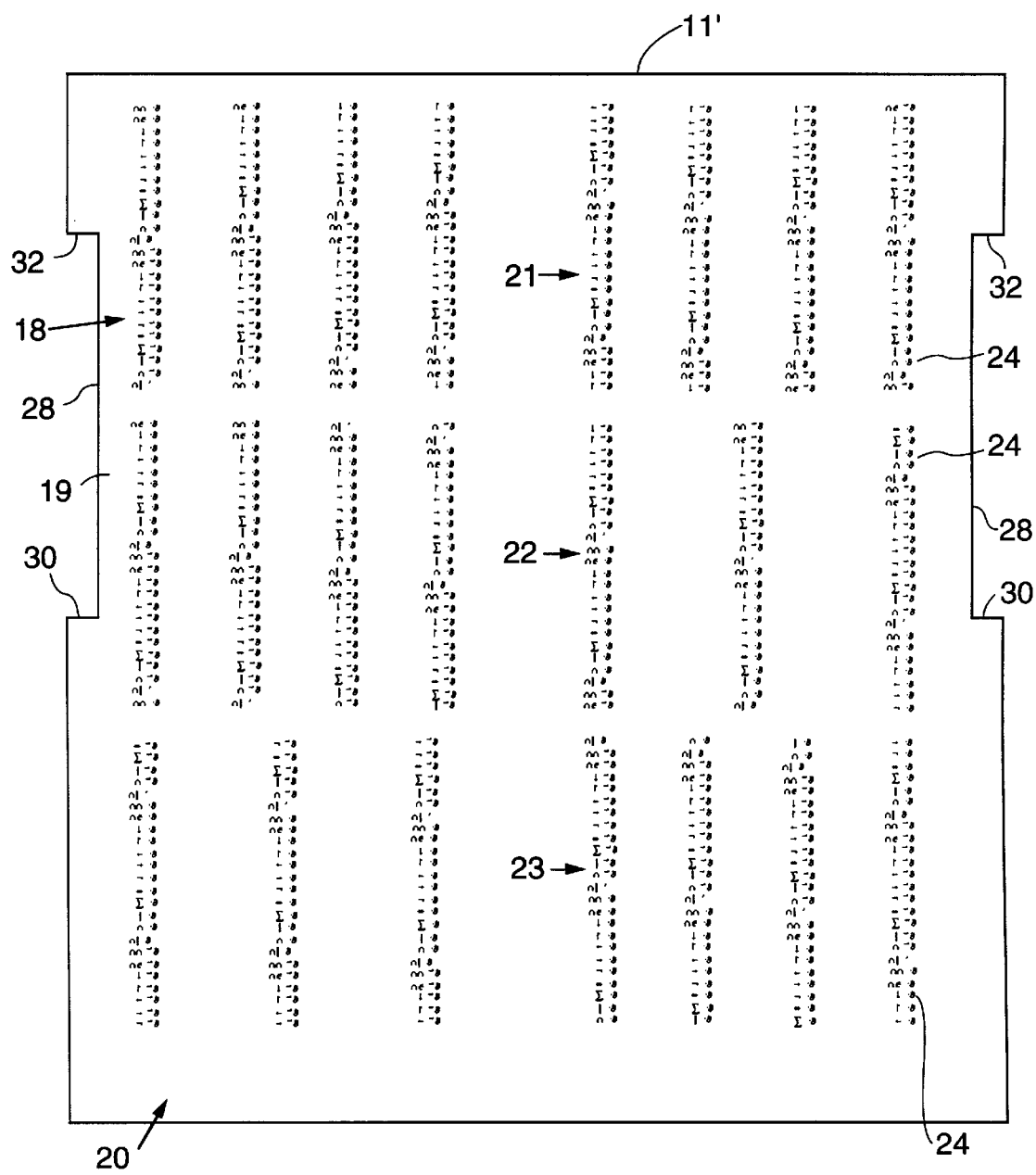
FIG. 10A is a plan view of the front side of the friction fit sliding insert of the embodiment of FIG. 10, illustrating the longitudinally disposed row configuration of incremental time designations and two rectangular recessed die cut stop mechanisms located at the top left and top right sides of the insert.

With reference to FIGS. 10 and 10A, another embodiment of the present invention is described in detail. In this embodiment the calculator booklet concept is adapted and formatted into a portfolio size measuring 8½×11 inches with four pages. The booklet can be fabricated using 14 point glossy paper stock or the Kimdura® synthetic material. In FIG. 10, page 1 is the cover page; page 1A is the back of the cover page. Pages 2 and 3 together form the chart page which contains six geographic area panel sets 4, 5, 6, 7, 8 and 9, twenty two die cut windows 10, twenty two time zone panels, 25 text columns and six geographic title boxes. Additional pages may be added to the booklet to display conversion tables and other useful data. The conversion tables may or may not operate using the sliding insert 11' to display information in die cut windows 10. The additional pages can also be used as an insert device for placement and encasement of the booklet in an executive portfolio. The booklet can be scored to fit either on the left or right side of an executive portfolio. Page 2 and page 3 are secured (by the means previously described in alternative embodiments described herein) to each other to form a sleeve in which the time columns insert 11' of FIG. 10A is placed. The insert 11' of FIG. 10A has dual recessed die cuts 28 which operate as stop mechanisms; one on the right side of the insert 11' and one on the left side of the insert 11'. Dual grommet holes 27 are located in the right and left margins of pages 2 and 3 at the vertical midpoint of page 2 and in the midpoint of each margin. Grommets (not shown) are inserted through the dual grommet holes 27 and expanded. At the bottom of the sleeve at the midpoint of pages 2 and 3 there is a cut out 13. This provides access to insert 11' that lies between pages 2 and 3. The insert is approximately 8½ inches wide and 11 inches in length. The insert 11' itself contains three sets of columns which illustrate the longitudinally disposed row configuration of incremental time designations. Because the chart page is all on a single page, the vertical time column and die cut windows used in the booklet format of FIGS. 1 and 6 are not needed, as reference to US and Canadian time zones is on the same page.

Figure 11:
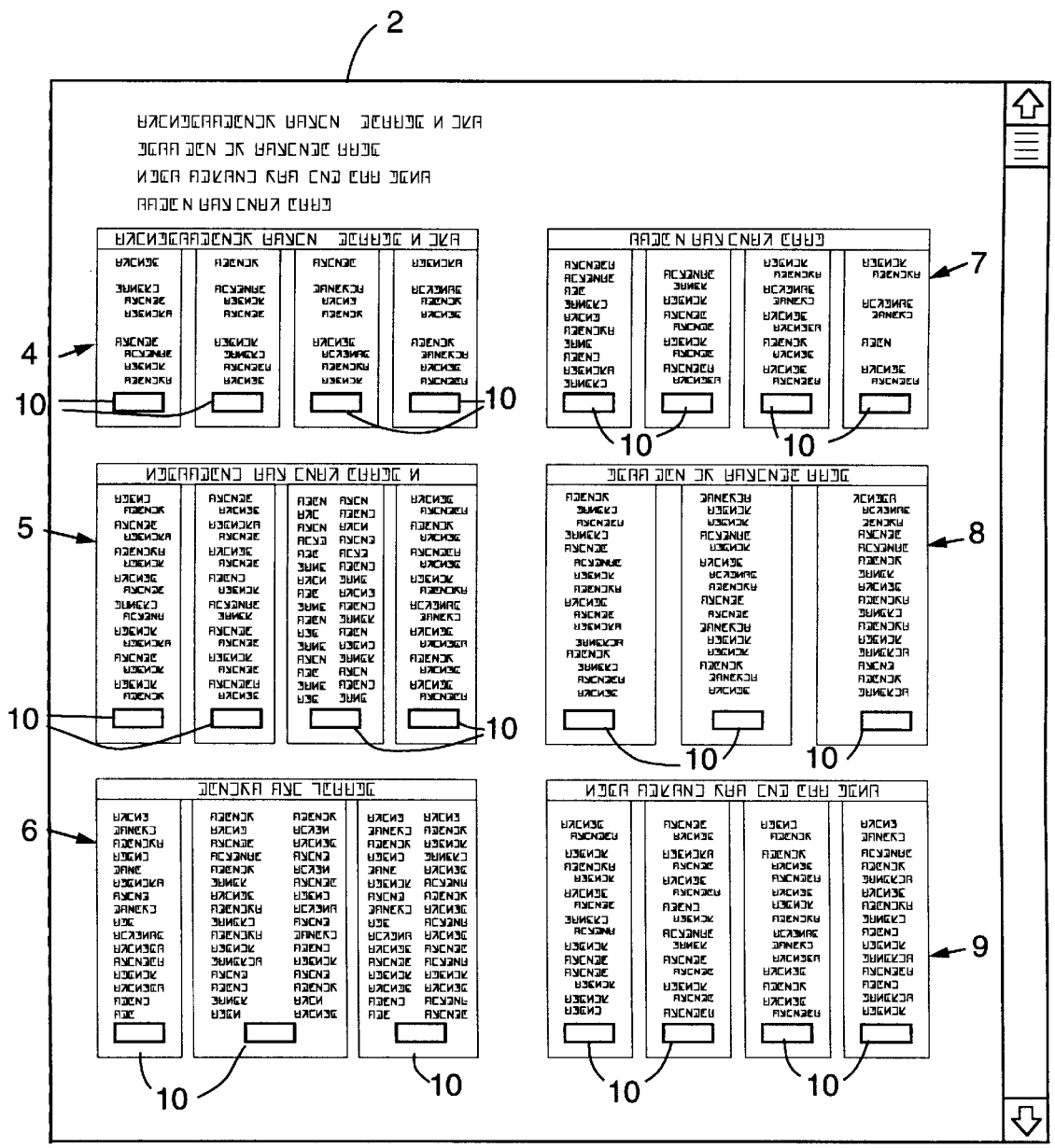
FIG. 11 is a plan view of the front page of an alternative embodiment of FIG. 10 which illustrates a computer monitor or personal digital assistant screen version of FIG. 10 with a right side scroll bar used to vertically move the underlying insert which contains the longitudinally disposed row configurations of incremental time designations.
Figure 12:
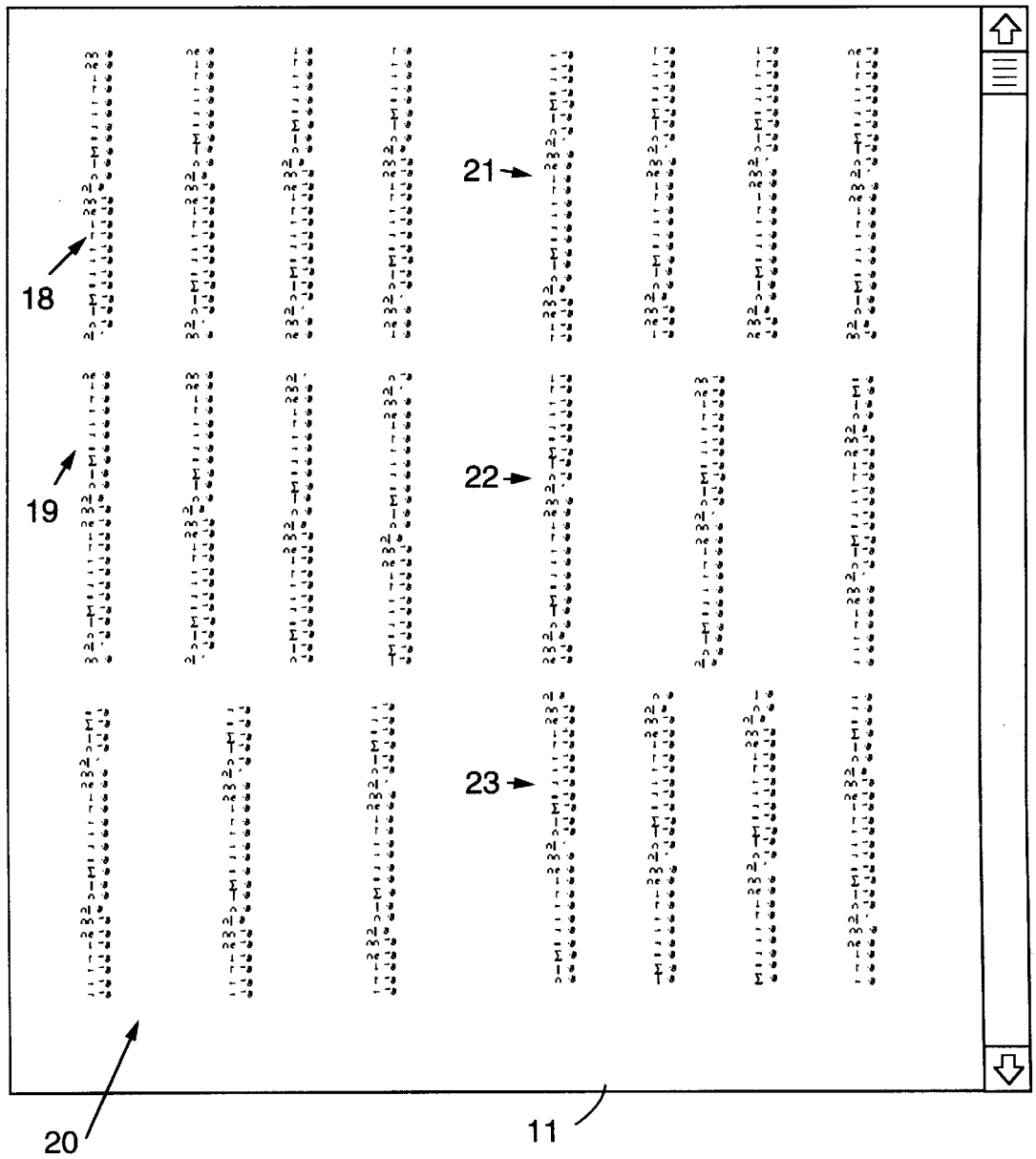
FIG. 12 is a plan view of the front side of the insert of the embodiment of FIG. 11, illustrating the longitudinally disposed row configuration of incremental time designations and the scroll bar for vertically moving the time designations.

With reference now to FIGS. 11 and 12, an alternative embodiment of the present invention is described in detail. The concept of the combined side by side chart pages and the combined side by side insert pages containing incremental time columns are reproduced using page making software application. One such software application is Java®, a cross platform software page making application published by Sun Microsystems, Inc., 2550 Garcia Avenue, Mountain View, Calif. 94043-1100. The combined chart page is overlaid on the combined insert numerical columns in such a manner so that it replicates the present invention and its operation. The numerical columns insert is moved vertically and down by the use of a scroll bar which is positioned at the right side of the chart page. By using the scroll bar button, the incremental time designations are moved vertically up and down and display standard times through each of the chart page display windows. Once the chart page and the scrolling insert page have been created, they are then configured so that they are compatible with and can be accessed in other popular software applications such as word processors, contact managers, project managers, scheduling managers, etc. This allows a user to access the invention and use it during a workday for such purposes as: programming telephone calls to diverse geographic locations with significant time differentials; to schedule the dispatch of news releases to different locations where there are significant time differentials; to schedule deliverables required to meet project objectives to assure that time differentials do not result in project delays; and to send documents securely at specific times when it is certain that a location will be operating with appropriate management. These are but a few of the tasks for which the invention can be utilized. Once a user has completed a task using the device, the pages are closed and are returned to a hard disk on which they reside until activated again.

As will be understood, the present invention provides an easily carried world time calculator which quickly provides information often needed by the frequent traveller as well as those involved in international business transactions. Furthermore, the present invention provides a comprehensive economical and durable alternative to various limited information electronic devices which are typically worn on a user's wrist. It is also adaptable for use in electronic devices such as personal computers, laptop computers, personal digital assistants, Web TV® and the Internet.

As various possible embodiments may be made of the invention and as various changes may be made in the embodiment set forth above, it is to be understood that all matter hereinabove described and shown in the accompanying drawings is to be interpreted as illustrative and not in a limiting sense.

I claim:

1. A global time calculator, comprising:
    an insert including a first side, a second side, and a single stop corner on a first edge of the insert, said first side and said second side having a plurality of longitudinally disposed rows of incremental time designations displayed thereon, said rows defining a plurality of transversely disposed sets of predetermined time designations; and
    a sleeve, wherein said insert is slidably connected with said sleeve so as to be shiftable in a vertical direction, said sleeve comprising a first side and a second side, both said first side and said second side of said sleeve operative to obscure vertically aligned time designations that are in excess of displayed time designations, wherein up to an entire length of a second edge of the insert slidably abuts an edge of the sleeve where the first side and the second side of the sleeve meet.

2. A global time calculator as claimed in claim 1, wherein said first side and said second side of said sleeve comprises:
    a plurality of panel sets, said panel sets comprising a plurality of geometrically shaped windows.

3. A global time calculator as claimed in claim 1, wherein said transversely disposed sets of predetermined time designations appear in a first color for time the same day and a second color for time the next day.

4. A global time calculator, comprising:
    an insert, wherein said insert includes a first side, a second side, and a single stop corner on a first edge of the insert, said first side and said second side having a plurality of longitudinally disposed rows of incremental time designations thereon, said rows defining a plurality of transversely disposed sets of predetermined time designations, wherein said time designations appear in a first color for time the same day and a second color for time the next day; and
    a sleeve, wherein said insert is slidably connected with said sleeve so as to be shiftable in a vertical direction, said sleeve comprising a first side and said second side, both said first side and second side of said sleeve operative to obscure vertically aligned time designations that are in excess of unobscured time designations, wherein up to an entire length of the second edge of the insert slidably abuts an edge of the sleeve where the first side and the second side of the sleeve meet and wherein said first side and said second side of said sleeve each comprise three panel sets, said panel sets comprising a plurality of geometrically shaped windows.

5. A global time calculator, comprising:
    an insert including a first side and a second side, and a stop mechanism, said first side and said second side having a plurality of longitudinally disposed rows of incremental time designations displayed thereon, said rows defining a plurality of transversely disposed sets of predetermined time designations; and
    a sleeve, wherein said insert is slidably connected with said sleeve so as to be shiftable in a vertical direction, said sleeve comprising a first side and a second side, both said first side and said second side of said sleeve operative to obscure vertically aligned time designations and wherein the stop mechanism comprises a recessed die cut on the insert and a grommet on the sleeve.

6. A global time calculator as claimed in claim 5, wherein said first side and said second side of said sleeve comprises:
    a plurality of panel sets, said panel sets comprising a plurality of geometrically shaped windows.

7. A global time calculator as claimed in claim 5, wherein said transversely disposed sets of predetermined time designations appear in a first color for time the same day and a second color for time the next day.

8. A global time calculator, comprising:
    an insert, wherein said insert includes a first side, a second side, and a stop mechanism, said first side and said second side having a plurality of longitudinally disposed rows of incremental time designations thereon, said rows defining a plurality of transversely disposed sets of predetermined time designations wherein said time designations appear in a first color for time the same day and a second color for time the next day; and
    a sleeve, wherein said insert is slidably connected with said sleeve so as to be shiftable in a vertical direction, said sleeve comprising a first side and a second side, wherein the stop mechanism comprises a recessed die cut on the insert and a grommet on the sleeve, and both said first side and said second side of said sleeve operative to obscure vertically aligned time designations that are in excess of unobscured time designations, and wherein said first side and said second side of said sleeve each comprise three panel sets, said panel sets comprising a plurality of geometrically shaped windows.

9. A global time calculator, comprising:
    an insert including a first side, a second side, and a single stop corner on a first edge of the insert, said first side and said second side having a plurality of longitudinally disposed rows of incremental time designations displayed thereon, said rows defining a plurality of transversely disposed sets of predetermined time designations; and
    a sleeve, wherein said insert is slidably connected with said sleeve so as to be shiftable in a vertical direction, said sleeve comprising a first side, a second side, and a securing means, wherein up to an entire length of the second edge of the insert slidably abuts an edge of the sleeve where the first side and the second side of the sleeve meet, and both said first side and said second side of said sleeve operative to obscure vertically aligned time designations that are in excess of unobscured time designations.

10. A global time calculator, as described in claim 9, wherein said securing means is selected from the group consisting of grommets, glue, epoxy, and reinforced tape.

11. A global time calculator as claimed in claim 9, wherein said first side and said second side of said sleeve comprises:
    a plurality of panel sets, said panel sets comprising a plurality of geometrically shaped windows.

12. A global time calculator as claimed in claim 9, wherein said transversely disposed sets of predetermined time designations appear in a first color for time the same day and a second color for time the next day.

13. A global time calculator, comprising:
    an insert, wherein said insert includes a first side and second side, and a stop mechanism, said first side and said second side having a plurality of longitudinally disposed rows of incremental time designations thereon, said rows defining a plurality of transversely disposed sets of predetermined time designations wherein said time designations appear in a first color for time the same day and a second color for time the next day; and a sleeve, wherein said insert is slidably connected with said sleeve so as to be shiftable in a vertical direction, said sleeve comprising a first side, a second side and a securing means, wherein the stop mechanism comprises a recessed die cut on the insert and a grommet on the sleeve, and both said first side and said second side of said sleeve operative to obscure vertically aligned time designations that are in excess of unobscured time designations, and wherein said first side and said second side of said sleeve each comprise three panel sets, said panel sets comprising a plurality of geometrically shaped windows.

14. A global time calculator, as described in claim 13, wherein said securing means is selected from a group consisting of metal grommets, glue, epoxy, and reinforced tape.

15. A global time calculator, comprising:

an insert, wherein said insert includes a first side, a second side and a stopping means, said first side and said second side having a plurality of longitudinally disposed rows of incremental time designations thereon, said rows defining a plurality of transversely disposed sets of predetermined time designations; and a sleeve, wherein said insert is slidably connected with said sleeve so as to be shiftable in a vertical direction, said sleeve comprising a first side, a second side and a securing means, both said first side and said second side of said sleeve operative to obscure vertically aligned time designations that are in excess of unobscured time designations, and wherein the stopping means comprises a recessed die cut on the insert and a grommet on the sleeve.

16. A global time calculator, comprising:

an insert, wherein said insert includes a first side, a second side and a recess, said first side and said second side having a plurality of longitudinally disposed rows of incremental time designations thereon, said rows defining a plurality of transversely disposed sets of predetermined time designations;

a sleeve, wherein said insert is slidably connected with said sleeve so as to be shiftable in a vertical direction, said sleeve comprising a first side, a second side and a securing means, both said first side and said second side of said sleeve operative to obscure vertically aligned time designations that are in excess of unobscured time designations; and a fastener for securing the sleeve about the insert, the fastener operative to limit movement of the insert within boundaries set by the recess.

17. A global time calculator, comprising:

an insert including a single stop corner on a first edge of the insert and a plurality of incremental time designations displayed thereon; and a sleeve, wherein said insert is slidably connected with said sleeve so as to be shiftable in a vertical direction, said sleeve operative to obscure vertically aligned time designations that are in excess of displayed time designations, wherein up to an entire length of a second edge of the insert slidably abuts an edge of the sleeve.

18. A global time calculator, comprising:

an insert including a recess and a plurality of incremental time designations displayed thereon;

a sleeve, wherein said insert is slidably connected with said sleeve so as to be shiftable in a vertical direction, said sleeve operative to obscure vertically aligned time designations that are in excess of displayed time designations; and at least one fastener disposed through the sleeve, the fastener operative to limit movement of the insert based upon a length of the recess.

19. The global time calculator of claim 18, wherein the recess comprises:

at least one open ended recess positioned along an edge of the insert.

20. The global time calculator of claim 18, wherein the recess comprises:

at least one enclosed recess positioned within boundaries formed by edges of the insert.

21. The global time calculator of claim 18, wherein the at least one fastener comprises:

a grommet.

* * * * *